United States Patent [19]
Munowitz et al.

[11] Patent Number: 5,109,464
[45] Date of Patent: Apr. 28, 1992

[54] RIB WAVEGUIDE OPTIMIZED FOR LOW LOSS COUPLING TO OPTICAL FIBERS AND METHOD OF DETERMINING SAME

[75] Inventors: Michael Munowitz, Naperville; David J. Vezzetti, Wheaton, both of Ill.

[73] Assignee: Amoco Corporation, Chicago, Ill.

[21] Appl. No.: 705,093

[22] Filed: May 24, 1991

[51] Int. Cl.⁵ .......................... G02B 6/00; G02B 6/14
[52] U.S. Cl. ................................. 385/130; 385/132
[58] Field of Search ........................... 350/96.12–96.15

[56] References Cited

U.S. PATENT DOCUMENTS

| | | | |
|---|---|---|---|
| 3,899,235 | 8/1975 | Arnaud et al. | 385/49 |
| 3,978,426 | 8/1976 | Logan et al. | 372/45 |
| 4,376,138 | 3/1983 | Alferness et al. | 437/143 |
| 4,904,039 | 2/1990 | Soref | 385/2 |
| 4,976,506 | 12/1990 | Pavlath | 385/14 |

Primary Examiner—Akm Ullah
Attorney, Agent, or Firm—Stephen G. Mican; William H. Magidson; Ralph C. Medhurst

[57] ABSTRACT

A raised-rib waveguide provides a low-loss coupling to a conventional single-mode optical fiber propagating light of a wavelength ($\lambda$). An exemplary embodiment of the waveguide is disclosed for a wavelength of 0.85 $\mu$m. In order to identify the values of the structural and compositional parameters of the raised-rib waveguide, a method employing a computer is used to identify a set of parameters that optimize the efficiency of the coupling of the waveguide to an optical fiber while maintaining the waveguide's ability to propagate a selected mode.

17 Claims, 23 Drawing Sheets

RIB WAVEGUIDE OPTIMIZED FOR LOW LOSS COUPLING TO OPTICAL FIBERS AND METHOD OF DETERMINING SAME

FIELD OF THE INVENTION

This invention relates generally to planar optical waveguide devices for use in optical communication systems, and more particularly to the design of such waveguides with low-loss coupling to standard optical fibers.

BACKGROUND OF THE INVENTION

Planar optical waveguides are typically used in optical communications to implement devices such as directional coupler switches, phase modulators and interferometric amplitude modulators. In such applications, planar waveguides are typically coupled to optical fibers at their input and output facets. Among the potential significant sources of power losses are those deriving from a mismatch between the fundamental modes of the planar waveguide and the optical fibers connected at these facets. Without special care, power losses at each facet can be very high, as much as 75 percent or greater.

In order to achieve low coupling losses between an optical waveguide and a fiber, the distribution of electromagnetic radiation at the facets of the waveguide should be roughly equivalent to the distribution provided by the optical fiber coupled at the facet. It has proven extremely difficult, however, to manufacture planar waveguide devices in which the distribution of electromagnetic radiation is roughly equivalent to that of the optical fibers commonly in use today. In particular, planar optical waveguides are made up of layers so as to have a rectangular geometry at their facets, whereas optical fibers are cylindrical in shape and have a circular or elliptical geometry at their facets.

In an optical fiber, the usual arrangement is that guiding and confinement of the optical fields are produced by changes in the refractive index that are distributed in a circularly symmetric or elliptical manner with respect to the cross-section of the fiber. The majority of optical fiber now used in telecommunication systems, particularly in long-distance systems, is monomode with a core of higher refractive index of the order of 15 microns or less wide, and a cladding of lower refractive index whose outer diameter is of the order of 125 microns. These fibers are used to transmit radiation of a wavelength in the range of 0.8 to 1.65 microns, the radiation propagating along the fiber in a single transverse mode. The beam spot generally has dimensions in the range of 5 to 15 microns and the cross-section of the beam is circularly symmetric or elliptical as a result of the distribution of refractive index changes in the fiber.

In contrast to the geometry of an optical fiber, a planar waveguide device is generally based on a slab of material in which changes in refractive index are more easily produced along flat interfaces rather than in curved distributions. For instance, a semiconductor planar waveguide device may be manufactured in the form of epitaxially grown layers of material on a substrate. Changes in refractive index can then most easily be produced in each of two perpendicular directions. First, changes can be produced at the interfaces between the layers of material by using material of different refractive indices. Second, changes in the perpendicular direction can be produced by making steps in the layers of materials, for instance by etching using a mask. The steps may then either be left exposed to air, which has a low refractive index compared to semi-conductor materials, or buried in suitable material of preselected refractive index. In general, these planar waveguides can be classified into a number of different basic types, including rib guides, strip-loaded guides, buried-channel guides and slab guides of various kinds.

In order to provide a low-loss coupling between the optical fiber and planar waveguide, it is known to modify the modal shape at the output of the fiber in an attempt to match the shape to the modal shape of the waveguide. For example, the output of an optical fiber can be focused somewhat through tapers and spherical lenses, but control over its fundamental mode is generally limited. Most of the available options for tailoring the modal shape of the fiber involve changing the radial distance scale while leaving the field pattern essentially circular and thus still poorly matched to the elliptically shaped modes typically associated with waveguides. Although it may be possible to alter the modal shapes of the fibers by using special lenses, the small sizes involved create experimental and production difficulties—e.g., alignment of special lenses used to interface the waveguide.

Some success has been achieved in altering the shape of the waveguide modes for a certain class of waveguides for the purpose of matching the modal shape of the waveguide to an optical fiber. In U.S. Pat. No. 4,776,655 to Robertson et al., a type of rib waveguide is disclosed that has values for its compositional and structural parameters that provide a modal shape which is approximately matched to the modal shape of a mating optical fiber.

For a rib waveguide of the type illustrated by Robertson et al., the guiding zone is well defined in the lateral direction by the presence of a material of lower refractive index, typically air, on either side of the rib. Therefore, in a lateral direction, there is a large change in refractive index that provides strong optical confinement. According to the Robertson et al. patent, the modal shape in the waveguide can be adjusted to provide an elliptical shape that approximates the circular shape of the optical fiber by providing a small change in the refractive index between the core and cladding on the order of 0.01 to 0.0001. This range of differences in the refractive indices provides a measure of control of the modal shape in the direction perpendicular to the layers of the waveguide. The Robertson et al. patent also provides ranges of values for the structure of the rib with respect to its height and width to further sculpt the shape of the modal structure propagated by the waveguide.

In contrast to the rib guide described in the Robertson et al. patent, which laterally confines a light beam by means of etching the rib into the guiding layer, a raised-rib waveguide is a less common guide that provides a rib etched into an upper cladding layer grown over the guiding layer. Both types of waveguides utilize the rib to laterally confine the light beam as it propagates along the guiding layer. Conventional rib waveguides are the most common and have been studied to various degrees. A raised-rib waveguide, however, has been examined in less detail and is less widespread.

A raised-rib waveguide shares many of the functional characteristics of the conventional rib waveguide, but it offers some advantages that make it an attractive alternative to the conventional rib guide. In both the conventional and raised-rib guide, some light is inevitably lost by scattering due to roughness at the air-guide interface. Such roughness develops when the upper layer is partially etched away to create the rib. By including an upper cladding, however, the raised-rib guide provides a dielectric buffer between the air and the core, thereby reducing the modal fields at the air-waveguide interface and also reducing the scattering at the surface of the waveguide. At the same time, the weaker fields at the surface of the raised-rib guide also limit to some extent the ability of the rib to confine the modes laterally.

In a raised-rib waveguide, the relationship between the values of each of the structural and compositional parameters and the shape of the modal structure is complex since they strongly affect both lateral and perpendicular confinement. In the rib waveguide of the Robertson et al. patent, the lateral confinement of the modal structure is well defined because the guiding region is bounded, laterally, by material of lower refractive index. In the raised-rib waveguide, lateral confinement is relatively weak because the guiding region is not bounded laterally by material of low refractive index and changes such as those suggested in the Robertson et al. patent in order to shape the modal structure provided by the waveguide have different effects in both the perpendicular and lateral dimensions of the guide.

SUMMARY OF THE INVENTION

It is a primary object of the present invention to provide a raised-rib waveguide having highly efficient coupling between an input or output facet of the waveguide and a standard optical fiber, which can be successfully implemented in a production environment. In this connection, it is also an object of the invention to provide such a highly efficient coupling without requiring substantial re-shaping of the mode at the end of the fiber.

In order to achieve the foregoing objects and others, the invention provides a raised-rib waveguide whose modal structure approximates the circular symmetry and size of the modal structure provided by an optical fiber coupled to the waveguide at an input or output facet, thereby providing a low-loss coupling between the two. The relationship between the structural and compositional parameters of a raised-rib waveguide and its modal structure is complex and not susceptible to an analytical solution. Therefore, the invention utilizes the computing power of a large computer to approximate numerical solutions for the purpose of defining a relation between each of the structural and compositional parameters of the waveguide and its modal shape. With these relationships defined, a set of values for the parameters can be identified that optimize the coupling to conventional optical fibers while maintaining the waveguide's ability to propagate light in the selected mode. Once this set of values have been identified, conventional epitaxial growth techniques and lithographic techniques can be employed in order to create the desired waveguide.

In order to identify the set of values for the compositional and structural parameters that best approximate a modal structure for the waveguide that matches to the modal structure of the optical fiber, an initial set of values are identified that are known to provide guided wave propagation at the selected wavelength. From this starting point, the effect of each parameter on the shape of the modal structure is investigated by varying the selected parameter over a range of values while the other parameters are held constant. Some parameters are found to have a strong effect on the shape of the modal structure, while others appear to have only a relatively weak effect. When varying the values of each parameter, an optimum value is identified that tailors the shape of the modal structure most closely to a circular one while at the same time keeping the waveguide above cutoff.

Using established mathematical methods, the shape of the modal structure can be determined for each new set of values of the parameters created by varying the values of the parameters in turn. By simply selecting values for the variable parameter while the values of the other parameters are held constant and observing a trend in the shape of the modal structure as the value is changed, the optimum value can be identified for maximizing the coupling efficiency between an optical fiber and the waveguide. By repeating this procedure for each of the structural and compositional parameters (i.e., varying one parameter while holding the others constant) an optimum set of values for the parameters can be identified that will define a waveguide having an approximately maximized coupling efficiency with an optical fiber at a selected wavelength ($\lambda$).

In the preferred approach to identifying the set of values for the structural and compositional parameters of the waveguide, parameters are selected as variables in a sequence beginning with the parameter that most strongly affects the modal structure and continuing with the next parameter in an order of decreasing effect on the shape of the modal structure. After the optimum value for a parameter has been identified, the value is substituted for the original value in the set of values and the new set is used as the set for varying the value of the next parameter. For example, the set of values used to identify the optimum value of the second most sensitive parameter includes a value of the most sensitive parameter that has been previously identified as optimizing the coupling. At the end of the sequence, a set of values for the structural and compositional parameters is identified that provides an excellent low-loss coupling between the waveguide and the optical fiber.

In the process of sequencing through each of the parameters, it may be that a slight adjustment of a previously determined optimum value for a parameter will allow a subsequently selected parameter to be varied over a wider range of values and, thereby, achieve a greater degree of coupling efficiency. Typically, this may occur if a parameter is at its optimum value very close to or at the cutoff of the desired mode.

DETAILED DESCRIPTION OF THE PRESENT INVENTION

Figure 1A:
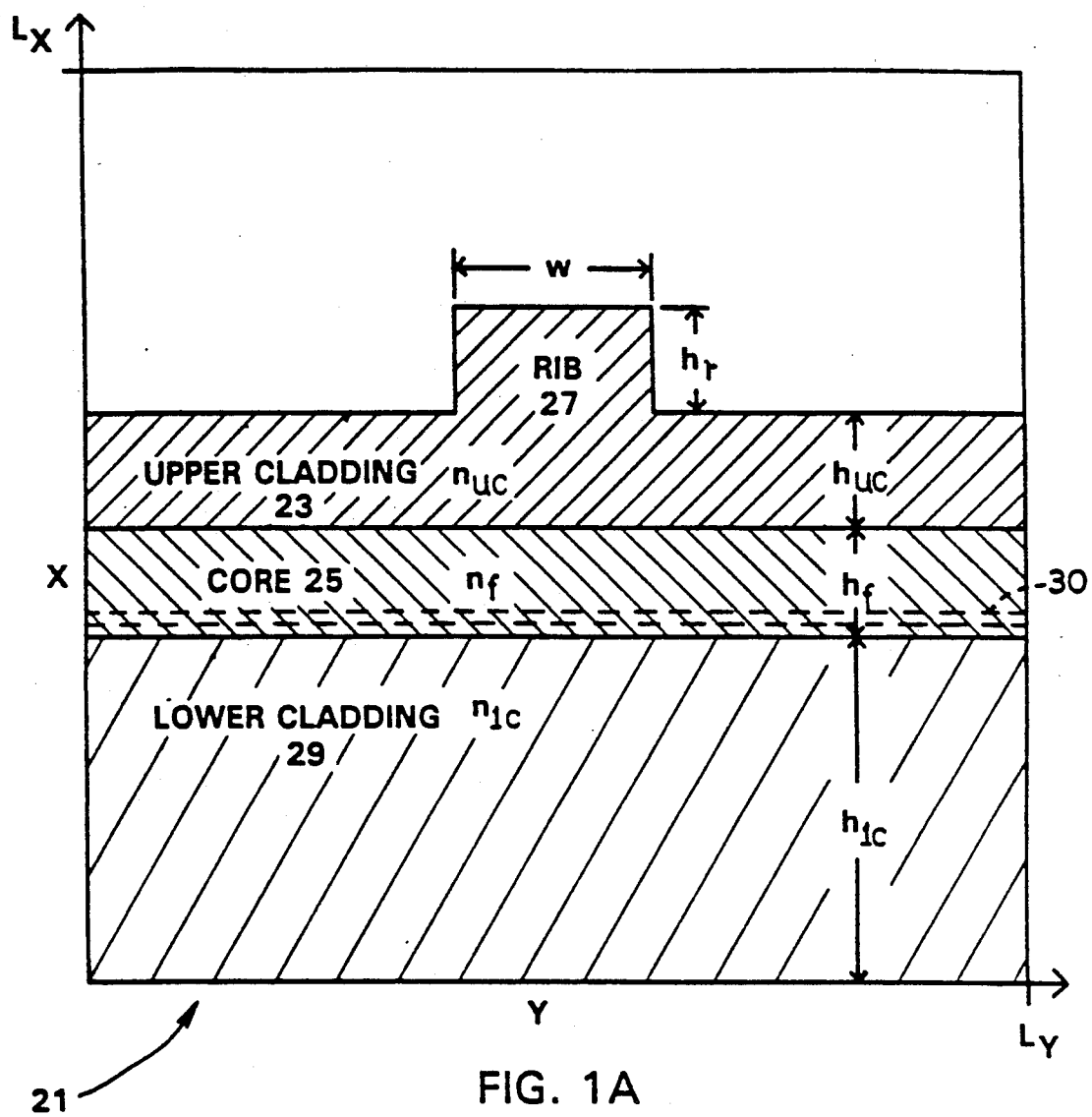
FIG. 1a is a cross-sectional view of a raised-rib guide having an upper layer formed by additional low-index cladding.

Turning now to the drawings and referring first to FIG. 1a, a raised-rib guide 21 has an upper layer 23 formed by low-index cladding just above a film core 25. A light beam is confined laterally within the guide 21 by means of a rib 27 etched into the upper layer 23 of the guide 21. For convenience, this structure etched from the upper layer 23 shall be hereinafter referred to as a "raised rib." In more conventional rib waveguides, there is no upper layer of cladding over the core 25. In order to provide a rib guide, the core itself is etched to form a rib.

The raised-rib guide 21 of FIG. 1a is specified by five structural and three compositional parameters. In FIG. 1a, these parameters are the heights ($h_f$), ($h_{lc}$), ($h_{uc}$) and ($h_r$) of the core 25, lower and upper cladding 29 and 23 and the rib 27, respectively, the width (w) of the rib and the refractive indices ($n_f$), ($n_{lc}$) and ($n_{uc}$) of the core 25 and lower and upper cladding 29 and 23. respectively. The values of these parameters can be controlled during the process of fabricating the waveguide 21. By appropriate choices of these values, one can shape the cross-sections of the guided modes in various ways as well as manipulate the conditions for cutoff and for single-mode behavior.

For many optical applications, it is useful to introduce into the core one or more thin layers of material with refractive index greater than $n_f$. Called quantum wells, these additional layers allow for further electro-optic control. By way of illustration, the dashed line 30 in FIG. 1A shows an exemplary quantum well in the core 25. In the event that the core contains a number q of quantum wells, each of height ($h_w$) and refractive index ($n_w$) we use as a model a single equivalent bulk layer with refractive index ($n_f'$) given approximately by $$n_f'^2 = [q\, h_w\, n_w^2 + (h_f - q\, h_w)\, n_f^2]/h_f \quad (1)$$

for a core of total height ($h_f$). Henceforth. we will understand by "refractive index of the core" either the refractive index of the homogeneous material constituting the core or the index ($n_f'$) defined above for the case of a core containing quantum wells. We will use the symbol ($n_f$) without the prime for either case.

Designing a waveguide for optimum coupling with a fiber requires both a qualitative grasp of the modal characteristics of the guide 21 and a quantitative analysis of the coupling efficiency. In keeping with the invention, iterative numerical computations generate a data base that leads to a qualitative understanding of how the different parameters affect the modal shape. From such an understanding, both lateral confinement and coupling efficiency can be optimized in a raised-rib waveguide.

In general, the best way to achieve this optimization is to relax the vertical confinement, generally by decreasing the height ($h_f$) of the core 25 and reducing the difference in refractive indices ($n_f$) and ($n_{uc}$) between the core 25 and the upper cladding 23. Excessively strong vertical confinement reduces the penetration of the electromagnetic field in the upper cladding 23 and the rib 27. If the field emerging from the core 25 is too weak, then the structure begins to resemble a slab guide; since the field barely reaches the rib 27, the rib itself can have little effect on guiding the wave and hence the field spreads laterally into a long and narrow mode. By permitting somewhat more field to emerge from the core 25, however, one can significantly enhance the effect of the rib 27 and, at the same time, reshape the mode so that it becomes approximately circular. With simultaneous adjustment of the height ($h_r$) of the rib, its width (w) and its distance ($h_{uc}$) from the core 25, the mode can be tightened laterally to the point where it extends roughly equally in both vertical and horizontal dimensions.

As will be shown, for a particular wavelength (λ) there exists a range of values for the parameters over which the coupling between the waveguide and the fiber should be highly satisfactory, with losses between −0.3 and −1.0 dB for both −5-μm and −9-μm fibers. For example, at wavelengths near 0.85 μm, best results are achieved for the core ranging in height ($h_f$) from 0.3 to 0.5 μm, core-cladding index differences ($n_f$)−($n_{uc}$) between 0.01 and 0.02 (approximately 2% to 3% difference in Al composition in AlGaAs), $(n_{uc})=(n_{lc})$, ribs 3 to 5 μm wide (w) and 1 to 3 μm high $(h_r)$ with a height of the upper cladding of approximately 0.4 μm $(h_{uc})$.

I. COMPUTATION OF MODES OF THE FIBER AND THE RAISED-RIB WAVEGUIDE

Figure 1B:
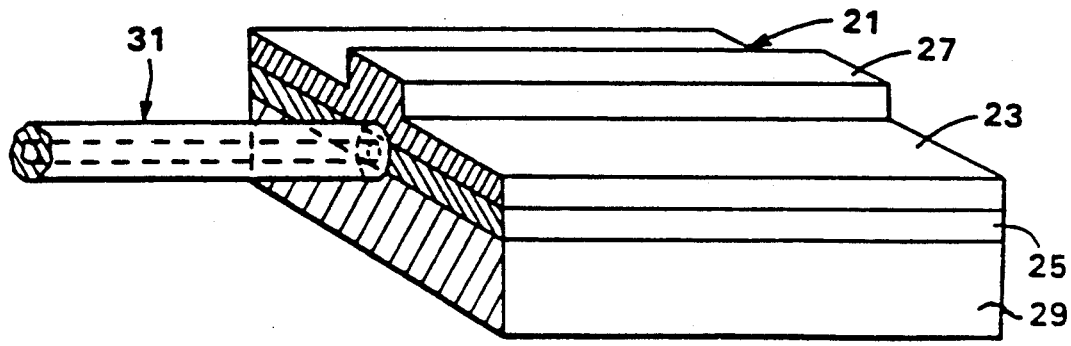
FIG. 1b is a schematic drawing illustrating a simple butt coupling of a conventional optical fiber to a raised-rib waveguide, where the scale of the fiber relative to the waveguide has been greatly reduced for purposes of clarity.

Referring to FIG. 1b, the guided modes of a circular fiber 31 butt coupled to the waveguide and those of the waveguide itself may be computed by any of several numerical methods. For the modes of the optical fiber 31, the Fourier-Grid method is particularly convenient. (see "Application of the Fourier-Grid Method to Guided-Wave Problems," M. Munowitz and D. J. Vezzetti, *Journal of Lightwave Technology*, Vol. 8, No. 6, p. 889, Jun. 1990.) For the raised-rib waveguide 21, however, the Fourier-series method outlined by Henry and Verbeek (C. H. Henry and B. H. Verbeek, "Solution of the Scalar Wave Equation for Arbitrarily Shaped Dielectric Waveguides by Two-Dimensional Fourier Analysis," *J. Lightwave Tech.*, vol. LT-7, pp. 308-311, 1989), provides a convenient way to compute the shape of the discrete modes. Both the Munowitz et al. and Henry et al. publications are hereby incorporated by reference.

According to the Fourier-series method, one assumes that the modes of the full-vector problem (particularly the transverse electric modes, with the electric vector largely parallel to the major interfaces of the structure) are well approximated by the solutions of the scalar wave equation. The guided modes then are of the following form:

$$u(x,y,z) = E(x,y) \exp(i\beta z). \quad (2)$$

where $$\beta = N_m k_0 \quad (3)$$

with $k_0$ being the vacuum wavenumber and $(N_m)$ the modal refractive index. Inserting these expressions into the scalar wave equation provides the following:

$$[d^2/dx^2 + d^2/dy^2 + k_0^2(n(x,y)^2 - N_m^2)] E(x,y) = 0 \quad (4)$$

We assume that the field is zero on the boundaries of a large rectangular domain $$0 \leq x \leq L_x \quad (5)$$

$$0 \leq y \leq L_y \quad (6)$$

completely surrounding the guide, where $L_x$ and $L_y$ are the lengths of the domain along the x and y axes, respectively. The mode is then expanded in a complete set of functions as follows:

$$E(x,y) = \sum_{lm} a_{lm} \phi_{lm} \quad (7)$$

where $$\phi_{lm} = (2/\sqrt{L_x L_y}) \sin(l\pi x/L_x) \sin(m\pi y/L_y). \quad (8)$$

Substituting equations (7) and (8) into equation (4) and integrating over the rectangular domain yields the following matrix eigenvalue equation:

$$\sum_{lm} [A_{l'm',lm} + (k_0 N_m)^2 \delta_{ll'} \delta_{mm'}] a_{lm} = 0. \quad (9)$$

where A is a matrix given by $$A_{l'm',lm} = [(l\pi/L_x)^2 + (m\pi/L_y)^2]\delta_{ll'}\delta_{mm'} - k_0^2 \int \phi_{l'm'} \phi_{lm} n(x,y)^2 dx dy. \quad (10)$$

The solution of equation (9) gives both the modal refractive index $N_m$ of the guided mode and the expansion coefficients, $a_{lm}$, from which the mode amplitude may be constructed via equation (7).

Several practical matters must be addressed before one can apply equation (9) to the solution of a particular waveguide. For use in a computer program, the equation must be simplified by appropriate approximations so that numerical results can be obtained. First, the infinite sums in equations (7) and (9) are truncated at $l_{max}$ and $m_{max}$, giving a matrix A of order $l_{max} \times m_{max}$ by $l_{max} \times m_{max}$ that can be evaluated using a properly programmed computer. The basis must be chosen large enough so that the shape of the modes can be reproduced with sufficient accuracy, but also small enough for the matrix eigenvalue problem to be solved in reasonable time with available computer memory. Using a Cray-2 computer system, for example, it has been found that typical CPU times for evaluating the terms in equation (10) (as described below) and solving the eigenvalue problem are:

| $l_{max}$ | $m_{max}$ | size of A | CPU sec |
|---|---|---|---|
| 30 | 40 | 1200 × 1200 | 22 |
| 40 | 40 | 1600 × 1600 | 45 |
| 50 | 50 | 2500 × 2500 | 170 |

A second computational issue concerns the numerical representation of the refractive index profile $n(x,y)$, which is most easily approximated by a number of rectangles wherein the index is constant. Taking $n(x,y)$ as piece-wise constant in this way allows the integrals in equation (10) to be computed analytically and the results inserted directly into the code of the computer program. Other simple shapes for which the integrals can be computed analytically may also be used. The alternative, numerical integration, generally is impractical because of the large number of terms involved.

A final consideration is the presence of additional solutions arising from the imposition of boundary conditions over the finite domain. These solutions, although legitimate for the finite model, are not present in the real waveguide since in that case both the lateral dimensions and the air layer above are virtually infinite. These extraneous modes may cause confusion if not understood properly, and one must separate them carefully from the bound modes according to the procedure given in "Analysis of Finite Rib Waveguides by Matrix Methods", D. J. Vezzetti and M. Munowitz, *Journal of Lightwave Technology*. Vol. 8, No. 8, p. 1228, Aug. 1990.

In the foregoing approach, the refractive index of a waveguide is specified on a grid of 55 by 55 points covering a space of 20 μm by 20 μm. For the optical fiber, the dimensions and indices used are

TABLE I

| Dimensions | | Index | | | |
| --- | --- | --- | --- | --- | --- |
| Core ($\mu$m) | Clad ($\mu$m) | Core (0.8 $\mu$m) | Clad (0.8 $\mu$m) | Core (1.3 $\mu$m) | Clad (1.3 $\mu$m) |
| "9 micron"* | | | | | |
| 8.3 | 125 | 1.4580 | 1.4528 | 1.4535 | 1.4483 |
| "5 micron" | | | | | |
| 5.0 | 125 | 1.4580 | 1.4528 | 1.4535 | 1.4483 |

*Corning SMF-28

These 9 and 5 micron fibers support single modes at light wavelengths ($\lambda$) of 1.3 $\mu$m and 0.85 $\mu$m, respectively. Note, however, that because of circular symmetry a "single-mode fiber" actually has two degenerate modes with orthogonal polarizations. The 9-$\mu$m core fiber, by contrast, supports more than one mode at wavelengths near 0.85 $\mu$m, with approximate ranges of wavelengths as set forth in TABLE II below.

TABLE II

| Number of modes | Wavelength ($\mu$m) |
| --- | --- |
| 1 | >1.3 |
| 3 | .85–1.3 |
| 4 | .84–.85 |
| 5 | .83–.84 |
| $\geq 6$ | <.83 |

The second and third scalar modes are degenerate in each instance where the fiber is multimode.

Figure 2A:
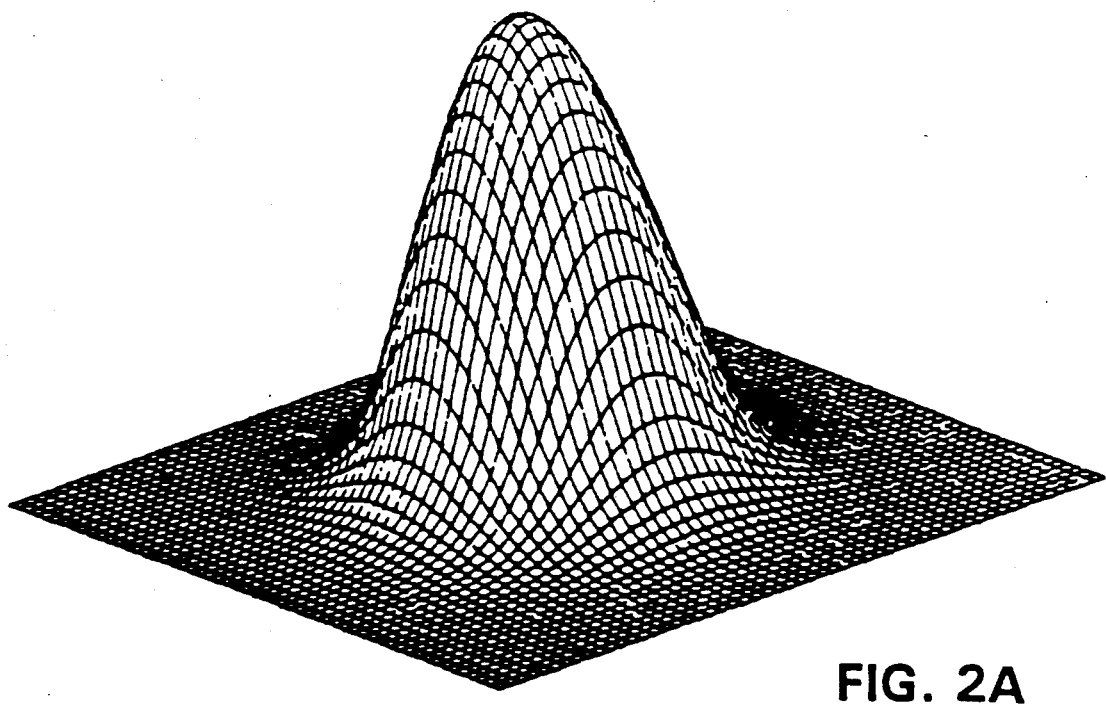
FIGS. 2a–2b illustrate mesh plots showing the special distributions of the amplitudes of the electromagnetic fields generated by a fundamental and secondary mode of a conventional 9 $\mu$m optical fiber at a wavelength ($\lambda$) of 0.85 $\mu$m.
Figure 2B:
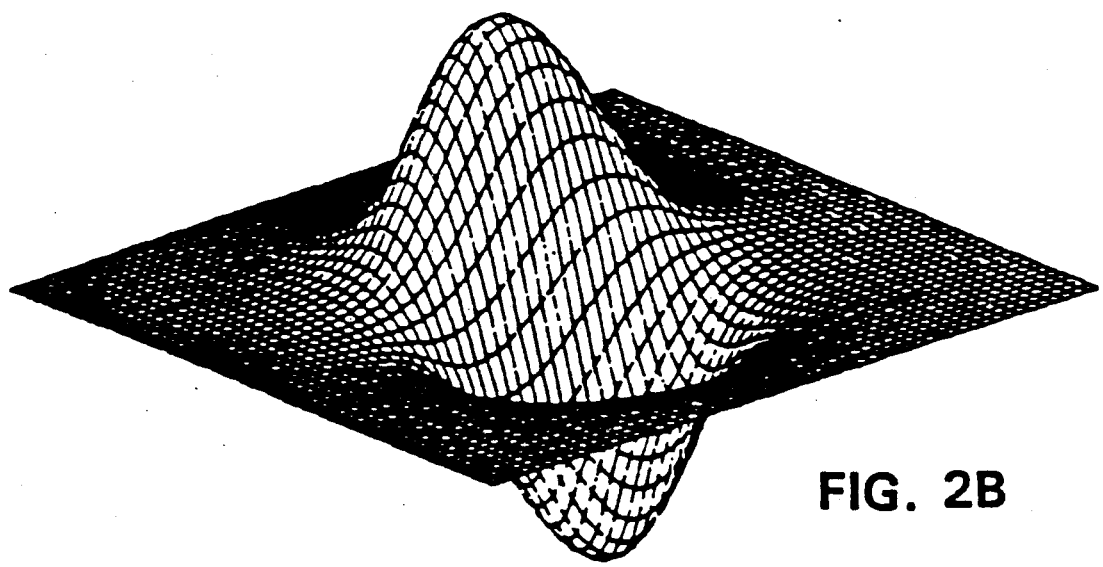
Figure 3A:
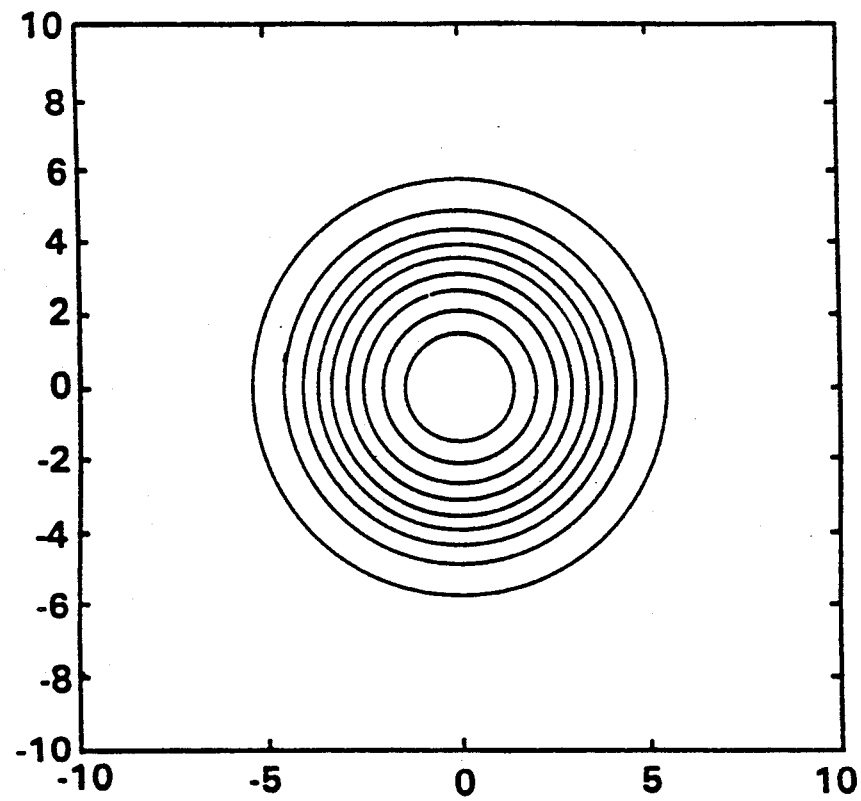
FIGS. 3a and 3b are contour maps showing lines of a constant electric field amplitude for the fundamental modes of a conventional nine (9) μm and five (5) μm diameter fiber, respectively, at a wavelength of 0.85 μm. where the contours are at increments of 10 percent from 10 percent to 90 percent of a maximum.
Figure 3B:
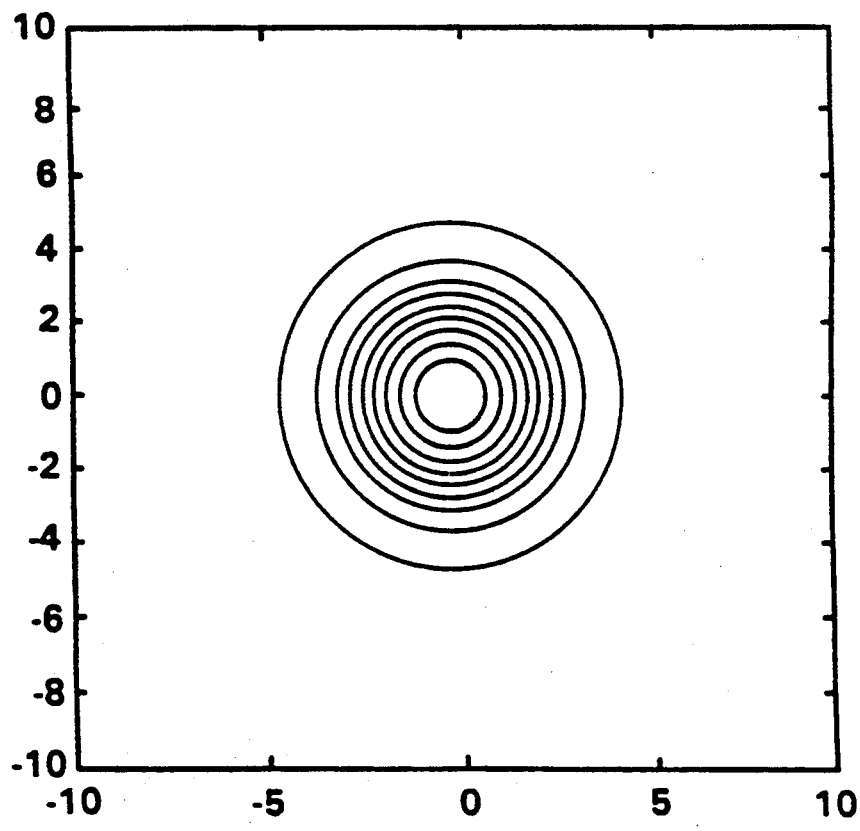

Mesh plots showing the fields of the first and second modes of the 9-$\mu$m fiber at a wavelength ($\lambda$) equal to 0.85 $\mu$m are illustrated in FIGS. 2a and 2b, respectively, while the contour maps in FIGS. 3a and 3b show the lines of constant field amplitude of the fundamental modes of both the 9-$\mu$m and 5-$\mu$m fibers, respectively, at 0.85 $\mu$m. The contours are equally spaced in FIGS. 3a and 3b from minimum to maximum. Just the coupling of the fundamental mode of each fiber to the waveguide will be considered. Note that the fields of the two fibers differ mainly in extent but not in shape. A useful measure is the diameter at which the intensity of the mode falls to $1/e^2$ of its peak value, computed as 7.8 $\mu$m and 5.6 $\mu$m for the 9 $\mu$m and 5 $\mu$m fiber, respectively.

II. CALCULATING THE SHAPE OF THE MODES

The foregoing mesh plots and contour maps of FIGS. 2 and 3 for the 5 and 9-$\mu$m fibers are derived using FORTRAN programs FIBFGH and EVEC, attached hereto as Appendices A and B, respectively. The program FIBFGH implements the Fourier-Grid method as described by Munowitz and Vezzetti in the previously identified publication in order to approximate the eigenvectors on a grid of 55 by 55 points. From these values, the modal amplitude for each point is determined and a commercially available program PC-MATLAB, published by The Math Works, Inc., of South Natick, Mass., generates the mesh plots and contour maps.

As previously mentioned, for determining the modal shapes of raised-rib waveguides, the Fourier-series method of Henry and Verbeek is preferred. Attached as Appendix C is a FORTRAN program RIB2DIM that implements the Fourier-series method on a raised-rib waveguide in order to approximate the eigenvalues and expansion coefficients of the modal eigenfunctions.

From these coefficients, the amplitude of a selected mode is found at each point of a 55×55 grid, using the FORTRAN program PAT55 attached as Appendix D. From the values found for the modal amplitudes at the grid points, the mesh plots and contour maps of FIGS. 4, 6, 8–9, 11–12 and 17 are generated using the commercially available program PC-MATLAB.

III. EVALUATING THE MODE OF THE WAVEGUIDE

Figure 4A:
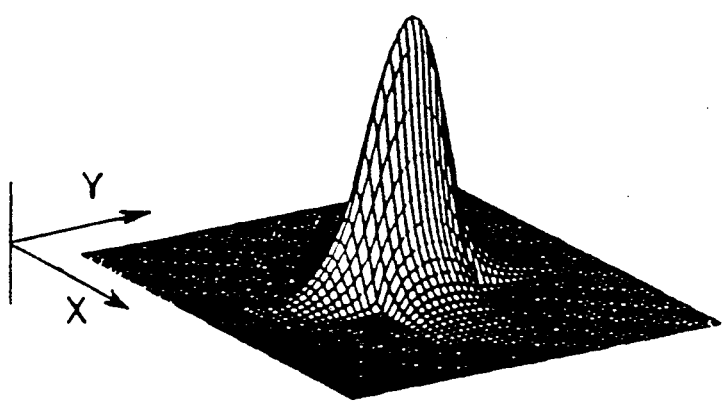
FIGS. 4a and 4b illustrate mesh plots showing the spatial distribution of the amplitudes of the electromagnetic fields produced by the fundamental and secondary modes, respectively, of a raised-rib waveguide.
Figure 4B:
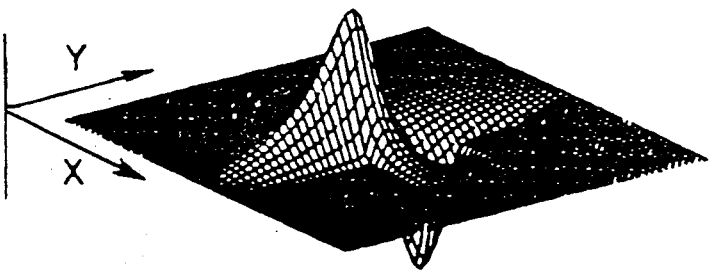

Guided modes of the raised-rib waveguide 21 are characterized by the number of oscillations of the field vertically (i.e., the growth direction, x, perpendicular to the major interfaces) and laterally (i.e., the lateral direction, y, parallel to the major interfaces). Mesh plots showing field amplitudes for two exemplary guided modes for the waveguide 21 are shown in FIGS. 4a–4b to illustrate the basic shape of the modes, and especially the perturbing effect of the rib 27. As always, the fundamental mode has just a single lobe in each of the vertical and lateral directions x and y. The second guided mode, if one exists, may have two lobes either in the vertical direction (x) or two in the lateral direction (y), depending on the precise structure of the guide 21. Such a mode shall be referred to as the second vertical or second lateral mode.

A. Lateral Guidance

Figure 5:
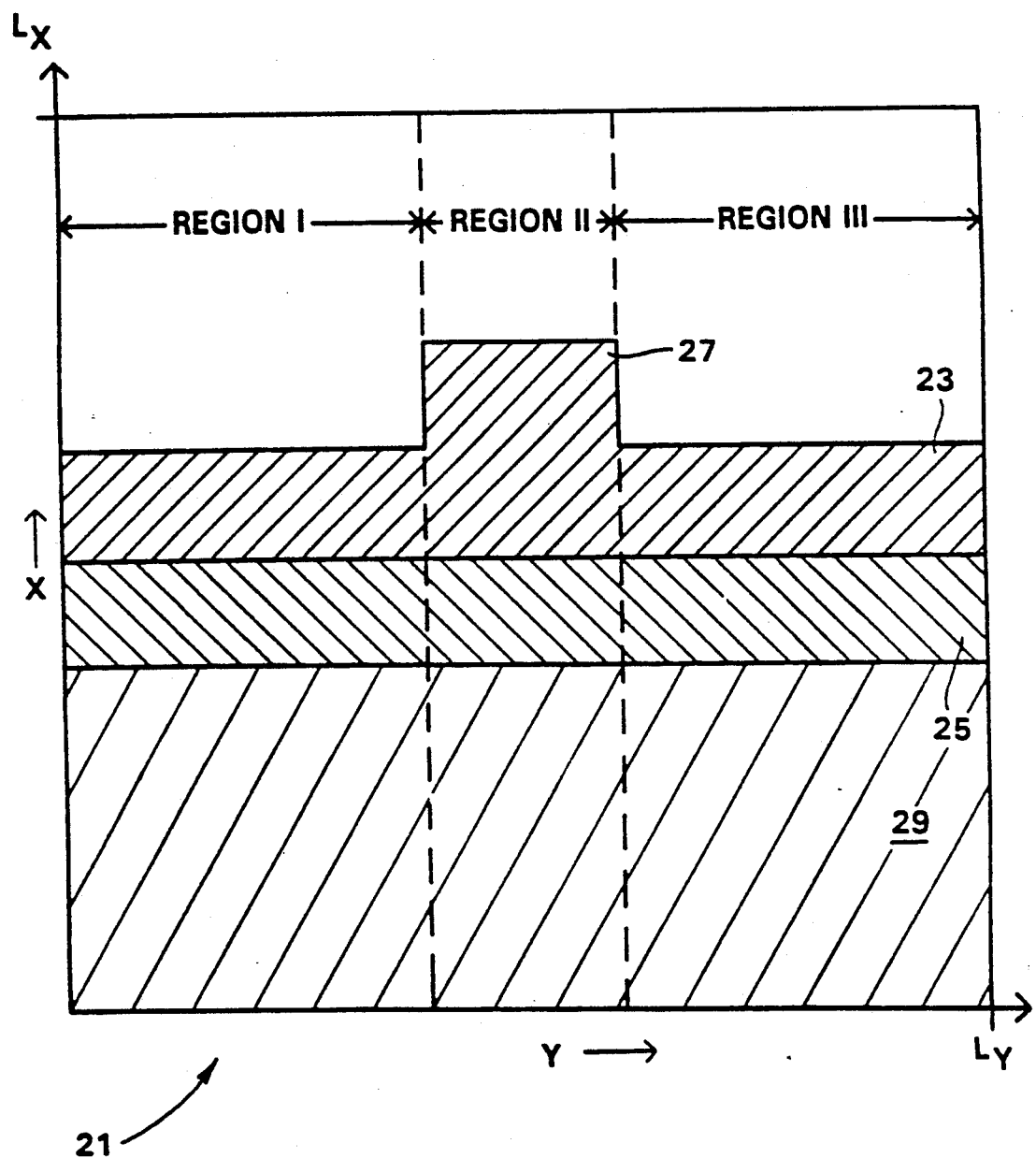
FIG. 5 illustrates the waveguide of FIG. 1a divided into three regions according to effective index theory.

Lateral guidance in the raised-rib waveguide 21 can be understood qualitatively by effective-index theory, according to which the two-dimensional profile n(x,y) in FIG. 1A is reduced to an approximate one-dimensional form as shown in FIG. 5. One considers, separately, each of the three regions I, II and III shown in FIG. 5, and computes the modal refractive indices of each region as if it were a four-layer slab guide made from lower cladding, core, upper cladding, and air. Knowing the effective indices of the three regions I, II and III, one then constructs a fictitious three-layer guide laterally, where the central layer (region II), with effective index $n_{eff}(II)$, is bounded by the two outer layers (regions I and III), having effective indices $n_{eff}(I)$ and $n_{eff}(III)$, respectively. If both $n_{eff}(I)$ and $n_{eff}(III)$ are less than $n_{eff}(II)$, then a guided mode can exist in region II. The lateral confinement becomes stronger as the difference in effective index increases, and especially so as the vertical mode in regions I and III is cut off. Even more than in a conventional rib waveguide, a change in the structural and compositional parameters of the core 25 significantly affects both the lateral and vertical confinement of a raised-rib waveguide. Therefore, the relationship between the parameters of the raised-rib waveguide and the modal shape of the guide is more complex than the same relationship for a conventional rib waveguide.

In FIG. 5, region II differs from the regions I and III on either side of it only by the extra dielectric material of the rib 27, giving region II in effect a thicker layer of the upper cladding 23. As a result, the effective index $n_{eff}(II)$ in region II generally exceeds the effective indices $n_{eff}(I)$ and $n_{eff}(III)$ in regions I and III. Thus the geometry of the raised rib 27 always allows for the possibility of a guided lateral mode; how many actually exist, and what shapes they take, however, is determined by the detailed interplay of the various structural and compositional parameters of the waveguide.

The ability of the raised rib 27 to effect lateral confinement is determined in part by the vertical decay of the modal field. Two simple limiting cases help illustrate the important points. First, if the field reaching the rib 27 in FIG. 5 (after decaying in the upper cladding)

is too weak, then the structure more closely resembles a slab guide and the relatively unperturbed mode thus is poorly confined laterally. This limit is approached when the decay length of the guided mode is small compared to the height ($h_{uc}$) of the upper cladding 23. Hence lateral confinement worsens with (1) increasing difference in the refractive indices ($n_f$) and ($n_{uc}$) of the core 25 and cladding 23, respectively, (2) increasing the height ($h_f$) of the core, and (3) increasing the height ($h_{uc}$) of the upper cladding.

Also, the perturbing effect of the rib 27 similarly decreases if the field over the rib is relatively uniform and nearly identical to that existing in the upper cladding 23 in regions I and III. Lateral confinement therefore is degraded when the rib 27 is too short relative to the decay length of the field. Moreover, the mode may be cut off under such conditions, especially when the waveguide 21 in the absence of the rib 27 is unable to support a guided mode. Lateral confinement also is controlled by the width (w) of the raised rib 27 just as in conventional rib waveguides, increasing as the width (w) of the rib is increased to the point where additional lateral modes can be supported.

B. The Effect Of Each Structural And Compositional Parameter On The Modal Structure These structural and compositional parameters of the waveguide clearly do not influence the modal structure independently. For example, the difference in refractive indices ($n_f$) and ($n_{uc}$) of the core 25 and the cladding 23, the height ($h_f$) of the core, and the value of the wavelength ($\lambda$) all combine to determine the decay length of the mode. Additionally, the height ($h_r$) of the rib 27 exerts different effects, depending on the height ($h_{uc}$) of the upper cladding layer 23. To achieve an analytical understanding of the effect on the modal structure of the values of the structural and compositional parameters of the waveguide, it is convenient to discuss each structural and compositional parameter separately, noting in certain instances how it may interact with others.

In the following examples, values are assigned to each of the compositional and structural parameters. In each example, the value of one of the parameters is varied while the others are held constant in order to determine the sensitivity of the modal shape to the selected parameter. In all of the examples, the wavelength is taken to be 0.85 μm, typical of that produced by GaAs/AlGaAs diode lasers. The material of the core 25 and upper and lower claddings 23 and 29 is assumed to be Al$_x$Ga$_{1-x}$As of different compositions, with the bulk refractive indices ($n_f$), ($n_{uc}$) and ($n_{lc}$) given by the model described in D. W. Jenkins, "Optical Constants of Al$_x$Ga$_{1-x}$As," *Journal of Applied Physics*, Vol. 68, p. 1848, 1990. The indices ($n_f$), ($n_{uc}$) and ($n_{lc}$) chosen for the examples run from 3.3601 (x=0.4) to 3.4165 (x=0.3) at the wavelength of 0.85 μm.

i. The Height ($h_{lc}$) of the Lower Cladding

The height ($h_{lc}$) of lower cladding must be enough to allow the modal amplitude to decay practically to zero at the point where the cladding meets the supporting substrate. If it is not, unwanted losses due to free carrier absorption in the substrate may result. The decay length in the lower cladding 29, which determines the height ($h_{lc}$) necessary, depends on how close the guided mode is to cutoff. The penetration of the field into this layer of the lower cladding 29 thus depends on the difference in refractive indices ($n_f$) and ($n_{lc}$) between core 25 and lower cladding 29, and on the closeness of the modal index to the index of the lower cladding.

ii. The Refractive Index ($n_f$) Of the Core

A refractive index of the core ($n_f$) or, more precisely, the difference in index ($n_f$)-($n_{uc}$) between core 25 and upper cladding 23, affects both the lateral and vertical confinement of the guided modes. FIGS. 6a-6d show a typical sequence of fundamental modes as the index ($n_f$) alone is increased, with the indices ($n_{uc}$) and ($n_{lc}$) of the upper and lower claddings 23 and 29, respectively, taken as being equal for simplicity. The outermost contour in each plot, and in the others to follow represents approximately 10% of the peak amplitude of the modal field (1% intensity).

Figure 6A:
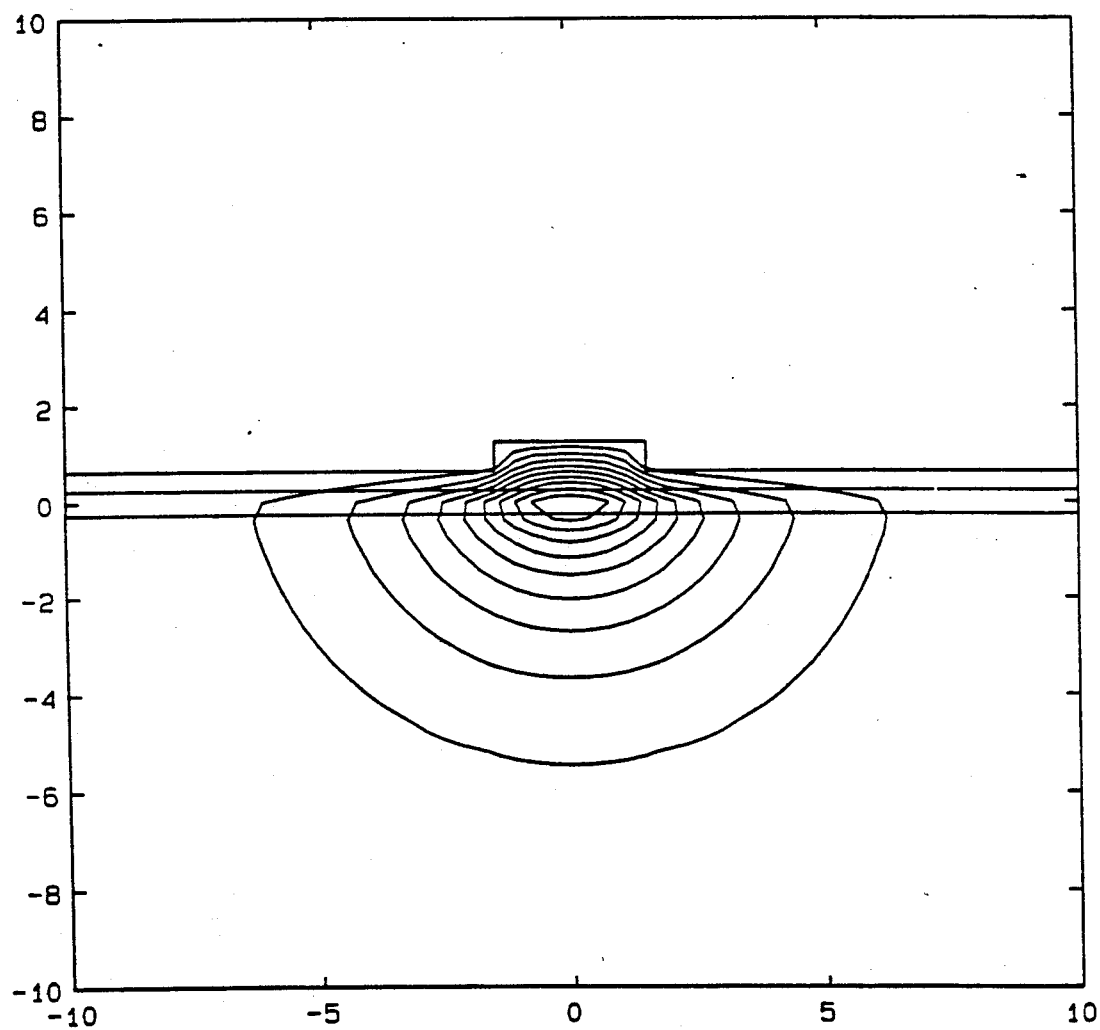
FIGS. 6a–6d illustrate a typical sequence of contour maps for the fundamental modes of the waveguide in FIG. 1 as a refractive index of the core ($n_f$) alone is increased, with indices of upper and lower claddings taken as equal for simplicity.
Figure 6B:
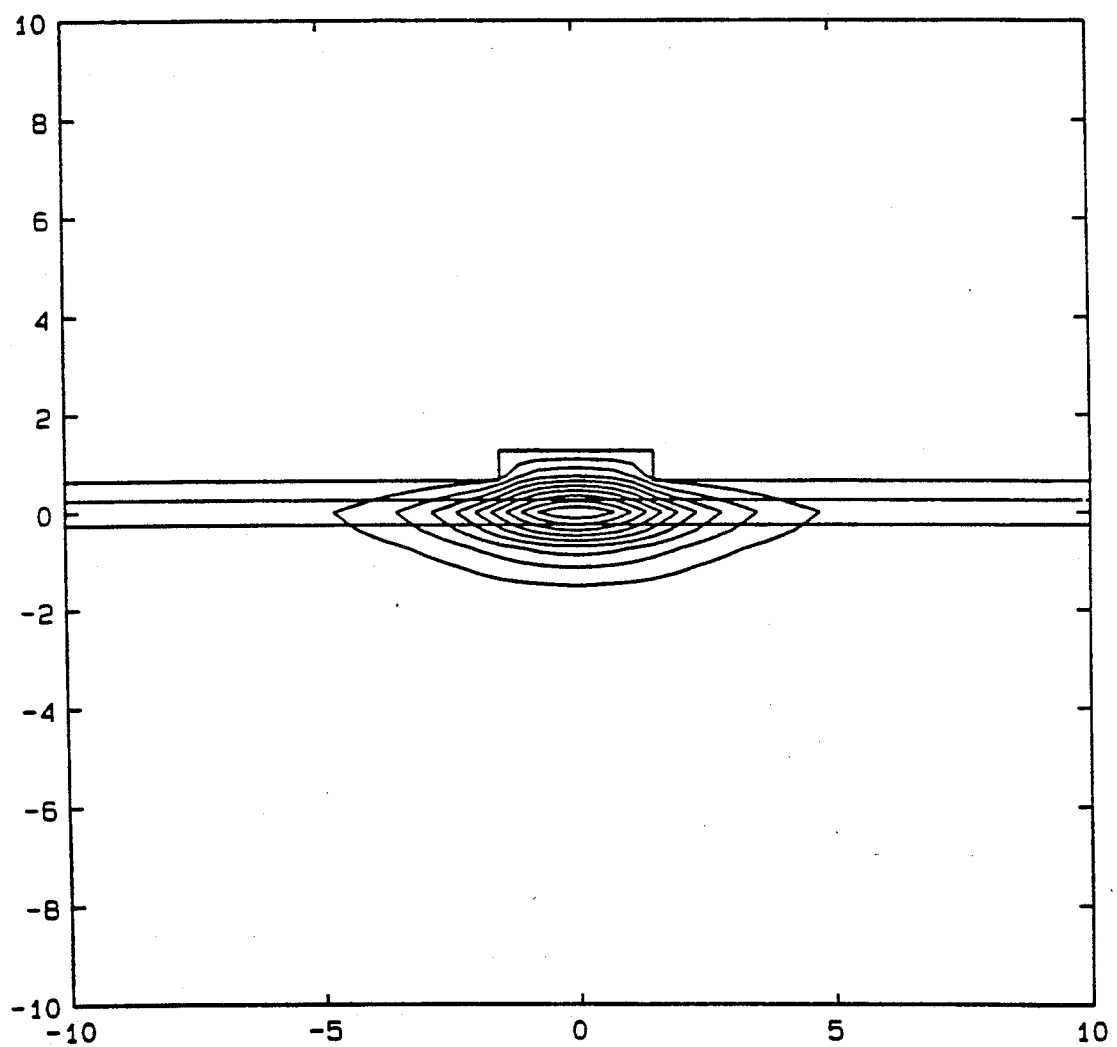
Figure 6C:
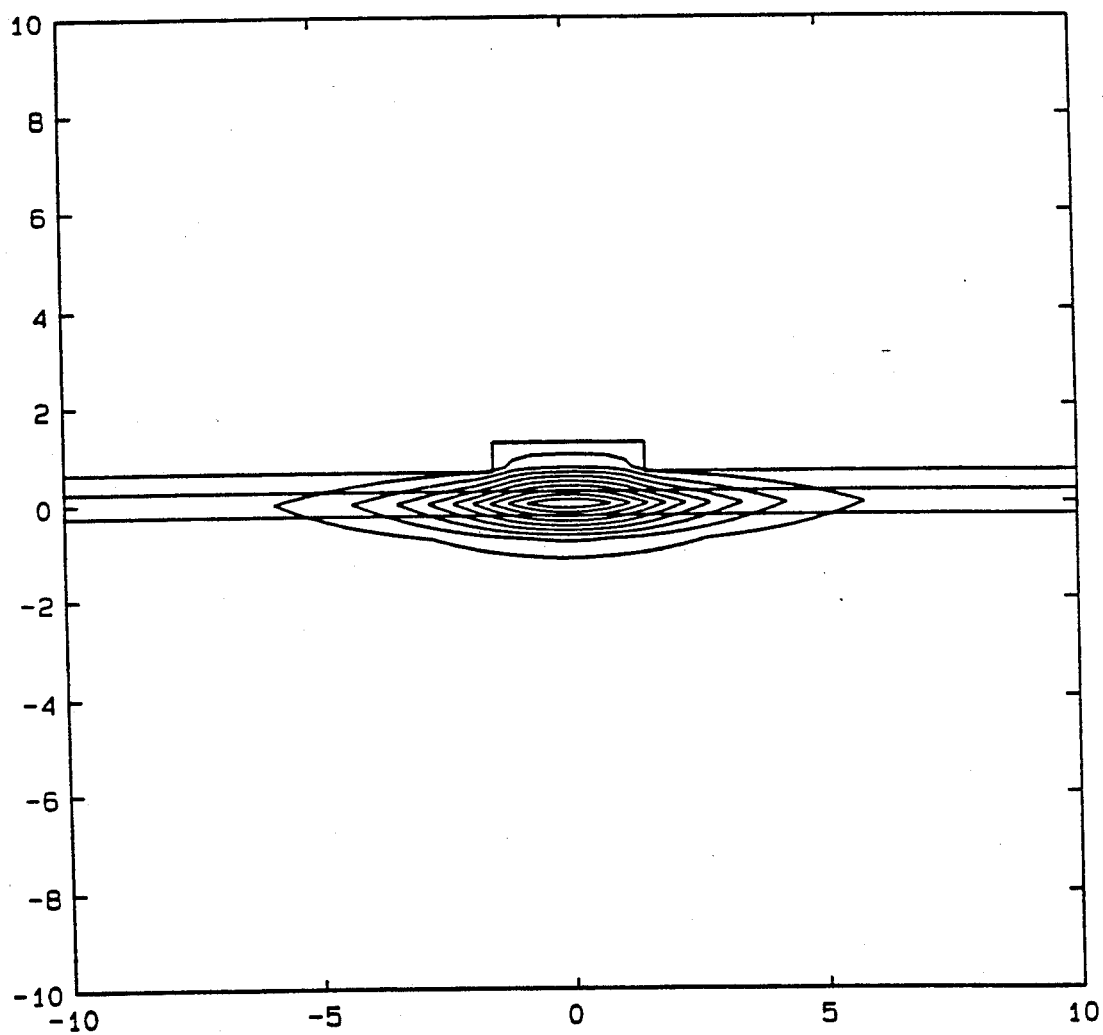

In FIGS. 6a-6d, the value of the refractive index ($n_f$) of the core 25 is varied from 3.3700 to 3.4165. All of the other parameters are held constant at the following values (in microns): (w)=3.0; ($h_r$)=0.6; ($h_{uc}$)=0.4; ($h_f$)=0.5 and ($n_{uc}$)=($n_{lc}$)=3.3601. The values of the refractive index ($n_f$) of the core in FIGS. 6a-6d are as follows: FIG. 6a - 3.3700; FIG. 6b - 3.3850; FIG. 6c - 3.4000 and FIG. 6d - 3.4165.

As in a conventional rib waveguide, increasing the difference between the indices ($n_f$) and ($n_{uc}$) increases the vertical confinement of the mode. The effect on the penetration of the field into the lower cladding 29 is clear from the profiles displayed in FIGS. 6a-6d. As the mode becomes better confined vertically, its shortened decay in the upper cladding 23 eventually reduces the ability of the rib 27 to effect lateral confinement [FIGS. 6b, 6c and 6d].

Figure 6D:
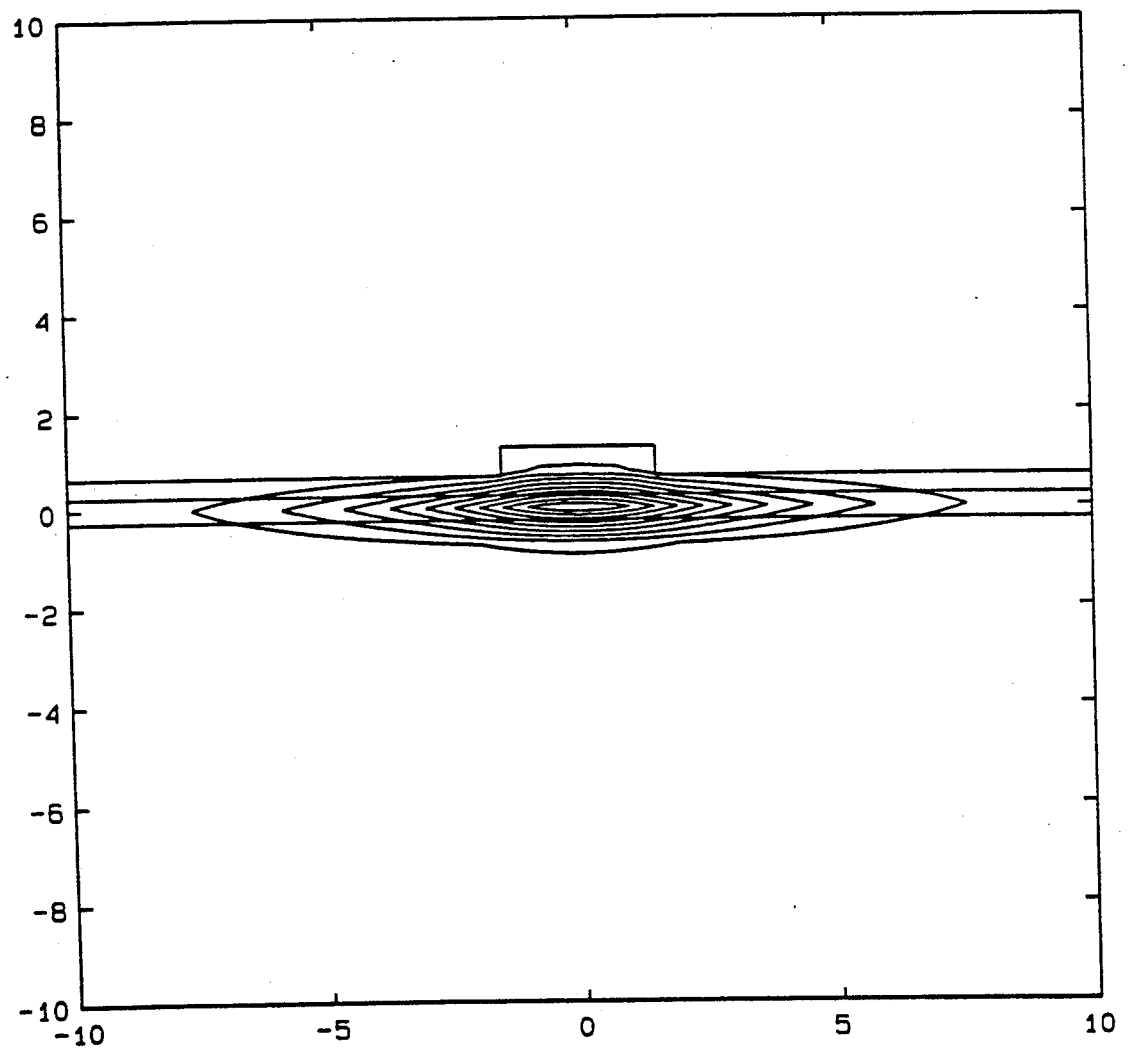

In comparing FIGS. 6a and 6d, an apparently anomalous improvement is noted in lateral confinement with increasing difference in the indices ($n_f$)−($n_{uc}$). Here, however, the mode in FIG. 6a is almost at its cutoff point, and the effective index ($n_{eff}$) in region II is only 3.3604 relative to the effective index ($n_{eff}$) in region I and III of 3.3601. For a slightly smaller value of ($n_f$), this mode in fact extends to the computational boundaries and then ceases to be a guided mode altogether. Under these conditions, the field emerging from the core 25 decays so slowly that the rib 27 is too short to support any mode. As the index ($n_f$) of the core 25 increases, the decay is brought into a range where lateral confinement is optimized before the "slab" limit is approached and the rib 27 loses effectiveness.

Figure 7:
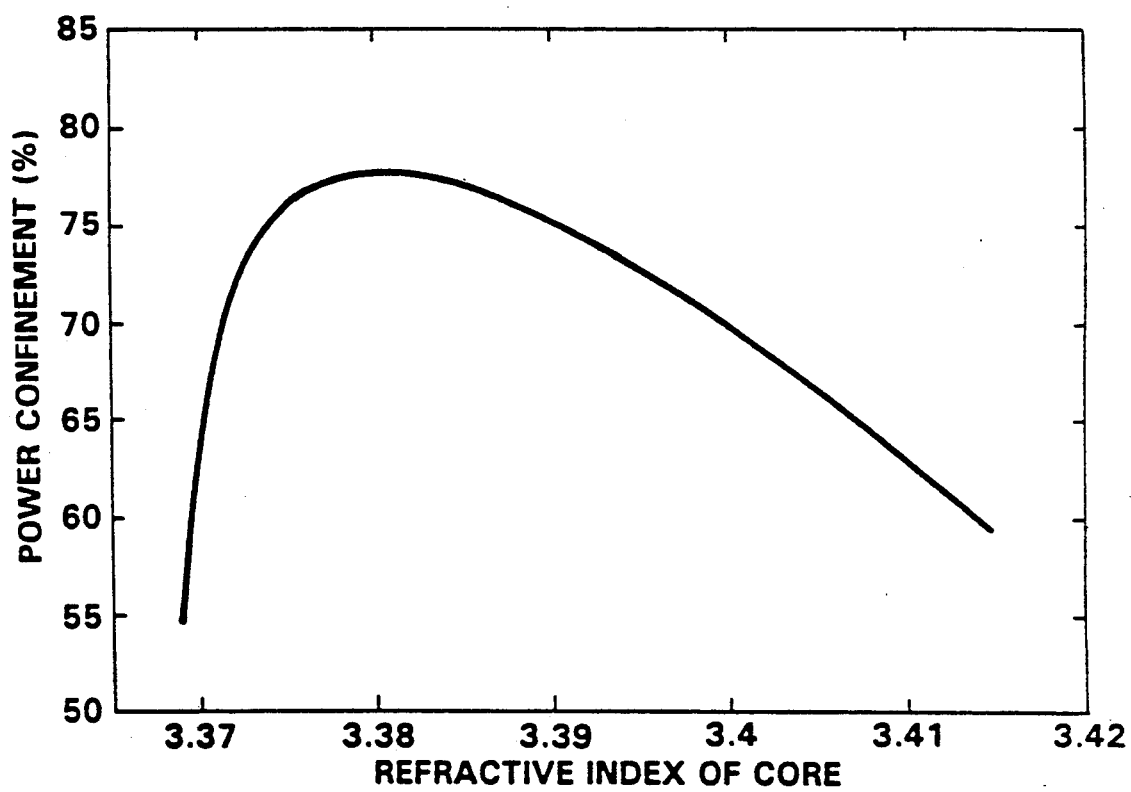
FIG. 7 is a line graph illustrating how lateral confinement is affected by changes in the refractive index ($n_f$)

The non-monotonic dependence of lateral confinement on the refractive index ($n_f$) of the core 25, illustrated further in FIG. 7, is an important feature of the structure, and shows as well that prediction of modal characteristics is not always straightforward in these waveguides.

As lateral confinement improves, the guide becomes able to support a second (antisymmetric) lateral mode. Such a mode develops, for example, under a 5-μm wide rib 27 when the refractive index ($n_f$) of the core 25 exceeds the index ($n_{uc}$) of the upper cladding 23 by approximately 0.02, and its lateral confinement similarly passes through an optimum range as the difference in indices increases. Although the guide 21 subsequently retains both modes for all values of the index ($n_f$), each mode spreading more and more as the indices of the core and upper cladding diverge. It is observed, nevertheless, that the second mode apparently loses its local character more readily than the fundamental. As the index ($n_f$) is increased still further, the core 25 eventually is able to support a second vertical mode as well, iii. The Height ($h_f$) of the Core

Figure 8A:
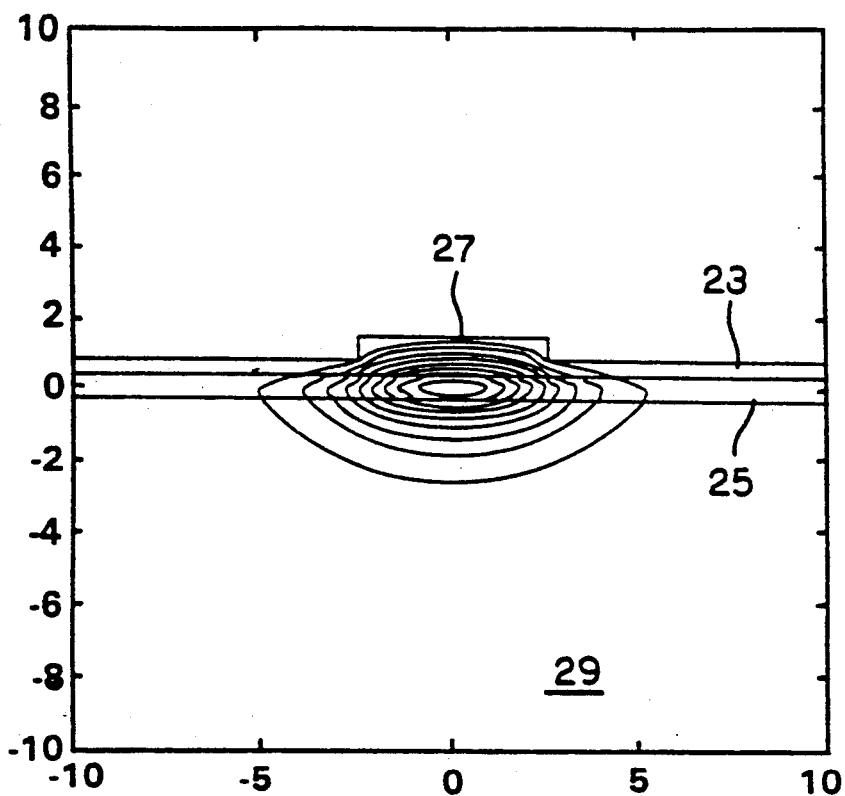
FIGS. 8a and 8b are contour maps illustrating how changes in the height ($h_f$) of the waveguide's core affect the modal shape, wherein all parameters are held fixed except ($h_f$)
Figure 8B:
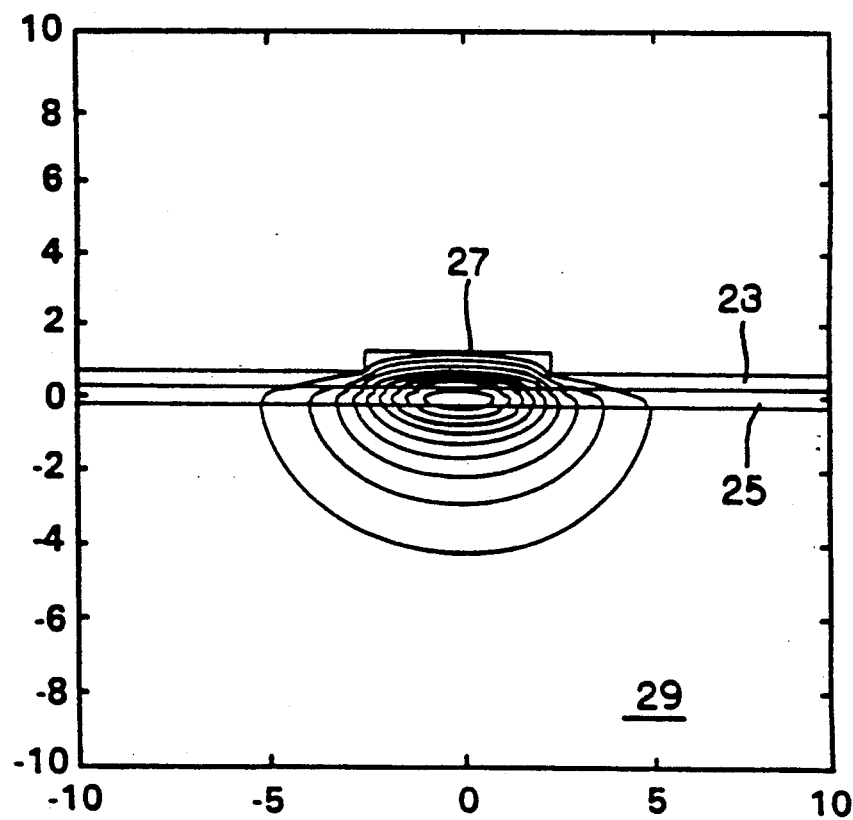

The height ($h_f$) of the core 25 influences the number of allowed vertical modes and the vertical extent of the mode pattern. The effect on the modal shape caused by varying the value of the height ($h_f$) of the core 25 is shown by the contours in FIGS. 8a-8b, in which all parameters are held fixed except ($h_f$). In FIGS. 8a and 8b, the value of the height ($h_f$) of the core 25 is 0.7 and 0.5 μm, respectively, whereas the other parameters are valued as follows (in microns): (w)=5.0; ($h_r$)=0.6; ($h_{uc}$)=0.4; ($n_f$)=3.3700 and ($n_{uc}$)=($n_{lc}$)=3.3601.

iv. The Height ($h_{uc}$) of the Upper Cladding

The height ($h_{uc}$) of the upper cladding 23, which helps determine the field amplitude at both the cladding-air interface and the rib 27, directly affects the lateral confinement of the guided modes. As the height ($h_{uc}$) of the upper cladding 23 increases, the rib 27 moves farther away from the core 25 and consequently is less able to influence the fields. Lateral confinement worsens as the height ($h_{uc}$) of the upper cladding 23 is increased, and the modes become more like those of a slab waveguide. Conversely, decreasing the height ($h_{uc}$) of the upper cladding 23 increases the lateral confinement and, depending on the other waveguide parameters, lateral modes of higher order may develop. A smaller, but still important, effect of increasing the height ($h_{uc}$) is to allow the mode to spread vertically.

Figure 9A:
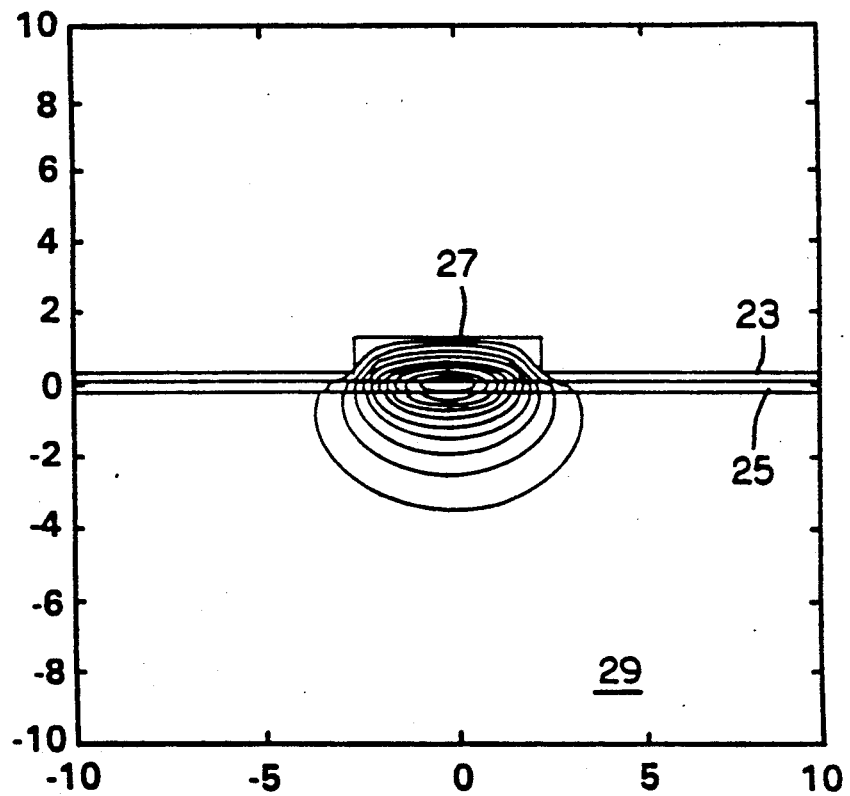
FIGS. 9a–9c are contour maps illustrating how changes in the height ($h_{uc}$) of the upper cladding affect the modal shape, wherein all waveguide parameters except ($h_{uc}$) are held fixed.
Figure 9B:
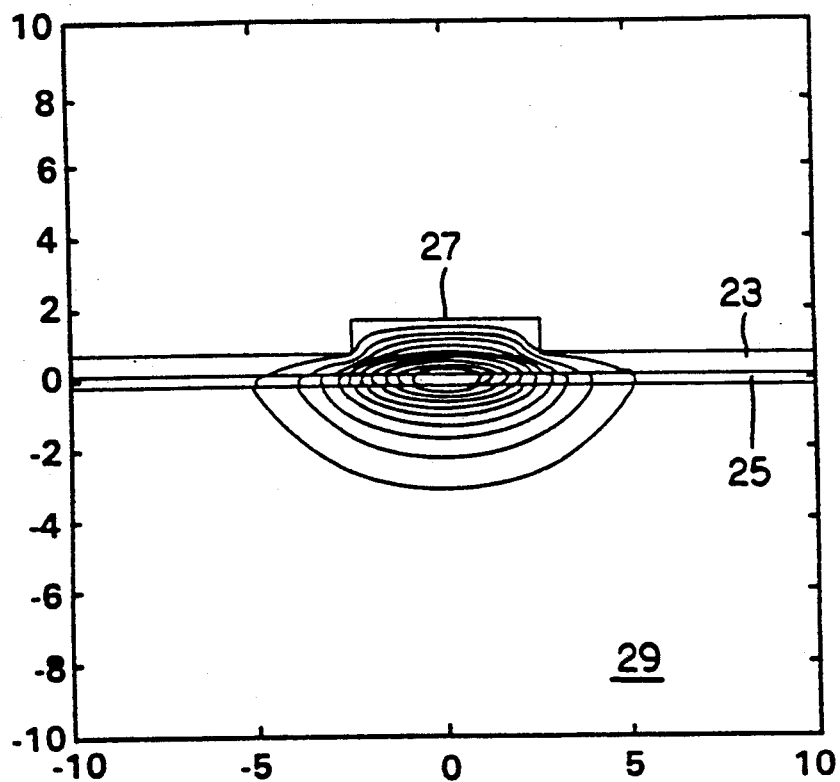
Figure 9C:
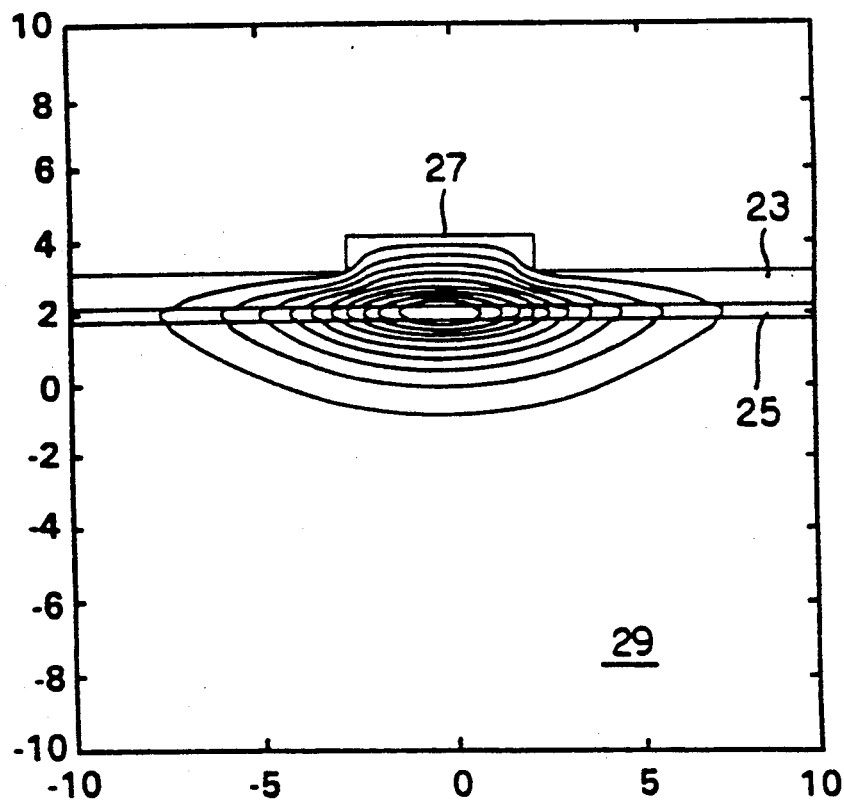

FIGS. 9a-9c clearly illustrate these effects by a sequence of contours of the fundamental mode in which all waveguide parameters except the height ($h_{uc}$) of the upper cladding 23 are held fixed. In each of the modal contours of FIGS. 9a-9c, the values of the height ($h_{uc}$) of the upper cladding 23 is 0.2, 0.6 and 1.0 μm, respectively. The values of the other parameters are held constant for all three contours and are as follows (in microns): (w)=5.0; ($h_r$)=1.0; ($h_f$)=0.3; ($n_f$)=3.3775 and ($n_{uc}$)=($n_{lc}$)=3.3601. Other parameters influence the field here as well, and thus interact strongly with the height ($h_{uc}$) of the upper cladding 23 in establishing lateral guidance.

Figure 10:
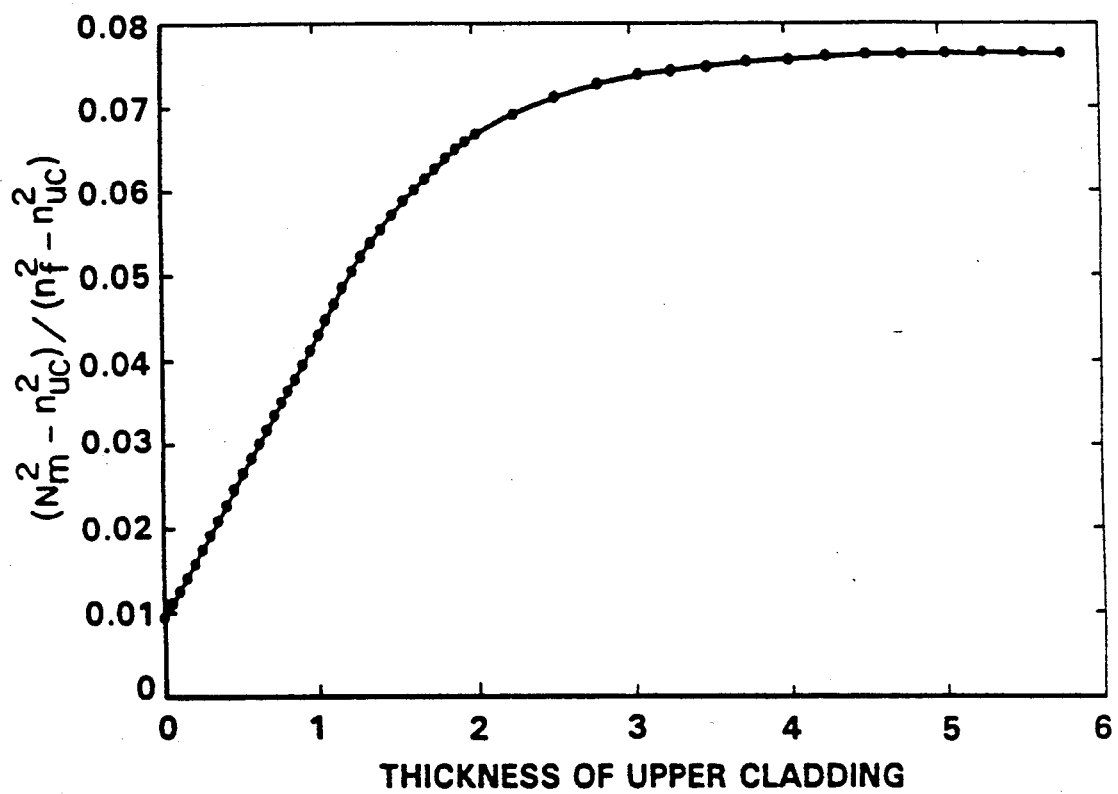
FIG. 10 is a dispersion curve showing how a modal refractive index approaches a limiting value of a slab as ($h_{uc}$) is increased for a particular example.

The upper cladding 23 is all that distinguishes the raised-rib guide 21 from a conventional strip-loaded guide. This additional layer 23 serves to remove the rib 27 to some distance from the core 25, so that the modes of the structure evolve smoothly from those of a strip-loaded guide when the layer is very thin to those of a slab guide when the layer 23 is very thick. The dispersion curve displayed in FIG. 10 shows exactly how the modal refractive index, defined by Equation (3), approaches the limiting value of the slab as the height ($h_{uc}$) of the upper cladding 23 is increased for a particular example. The quantity plotted is the normalized modal refractive index b, $$b = (N_m^2 - n_{uc}^2)/(n_f^2 - n_{uc}^2) \quad (11)$$

v. The Height ($h_r$) of the Rib

The height ($h_r$) of the rib 27 protruding above the upper cladding 23 has two important effects on the shape of the guided modes. The first effect concerns the extent of lateral confinement. In the limit where the height ($h_r$) goes to zero, the waveguide reduces to a slab and hence the guided modes are unconfined laterally. With increasing height ($h_r$) of the rib 27, the effective index ($n_{eff}$) in region II under the rib increases with respect to regions I and III, and the modes become better confined laterally.

The second effect of the height ($h_r$) of the rib 27 concerns the degree to which the mode extends vertically, and whether the natural decay of the field is altered by the presence of the rib. Decay into the rib is determined in part by the difference in index between the core 25 and the upper cladding 23, with the decay length increasing as this difference narrows. If the rib 27 extends for less than an exponential decay length, the mode naturally will reach the upper edge of the rib. Then as the height ($h_r$) of the rib 27 increases, the vertical extent of the field grows with it until the height ($h_r$) exceeds the decay length. Once the height ($h_r$) becomes equal to a few decay lengths, further increase has little effect.

Lateral confinement also is influenced by the decay of the field into the rib 27, and so the height ($h_r$) required is in turn influenced by the other parameters governing the vertical extent of the mode—i.e., principally the difference in index between core 25 and the upper cladding 23, and the value of the height ($h_{uc}$) of the upper cladding. The field emerging from the core 25 must have sufficient space to decay over the rib 27 if indeed the rib is to have any effect. A field that barely decays over the height ($h_r$) of the rib 27 simply passes over the rib unperturbed.

Figure 11A:
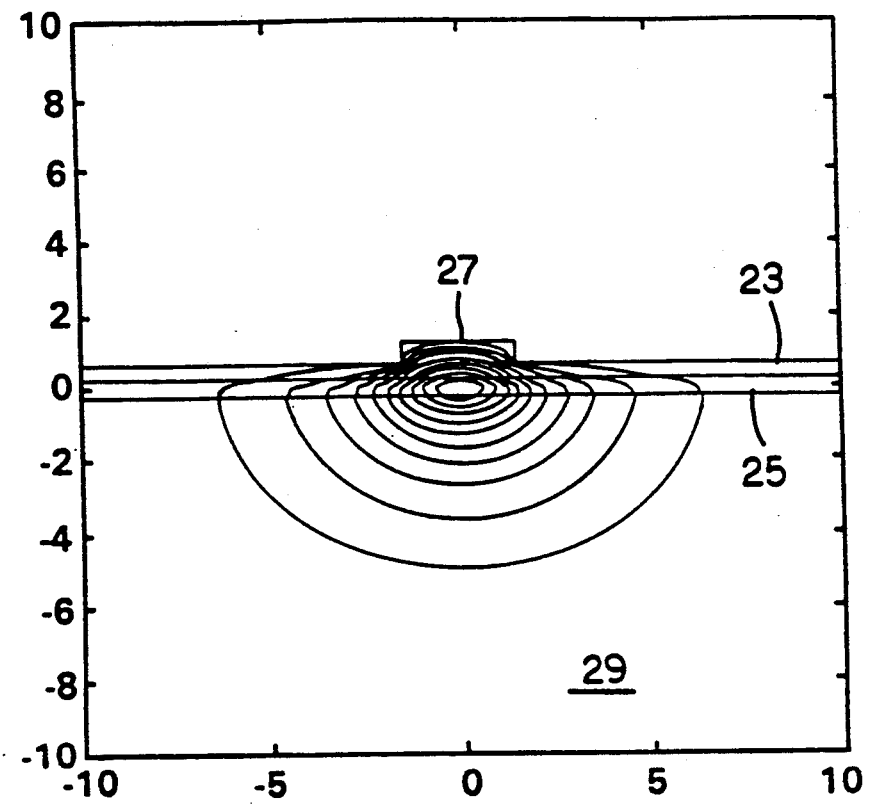
FIGS. 11a–11d illustrate a sequence of contours as the height of the rib ($h_r$) is increased while all other parameters are held fixed.
Figure 11B:
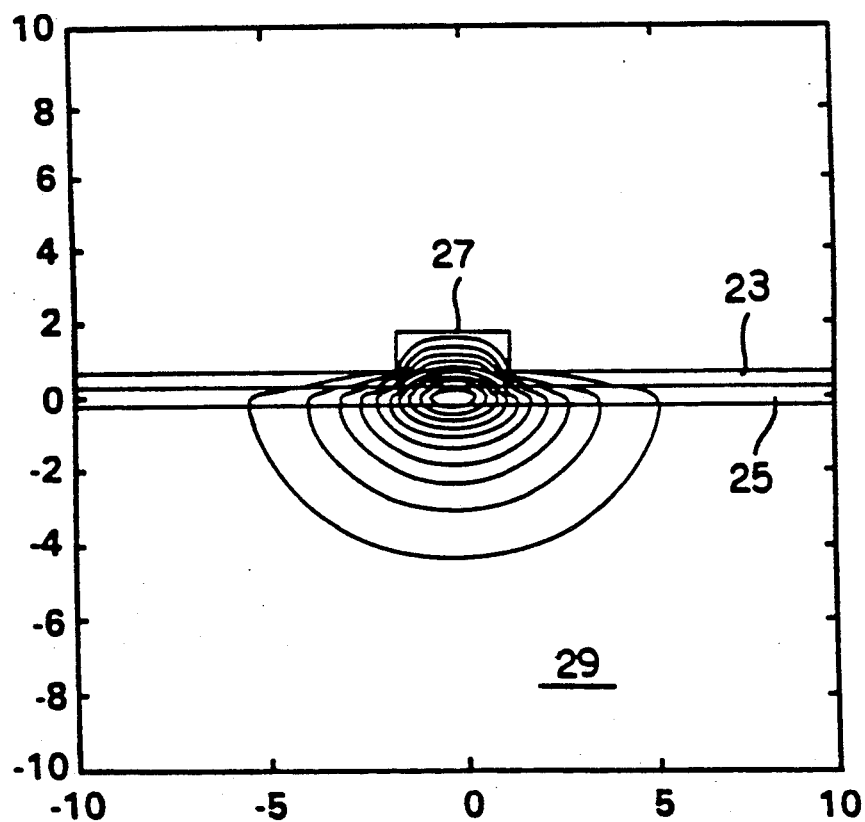
Figure 11C:
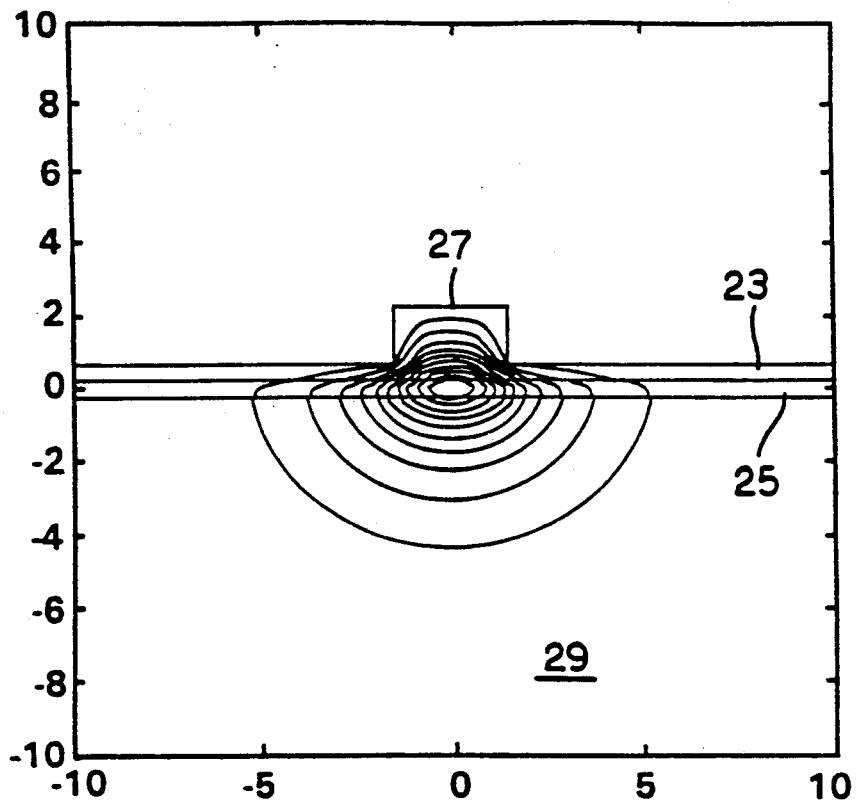
Figure 11D:
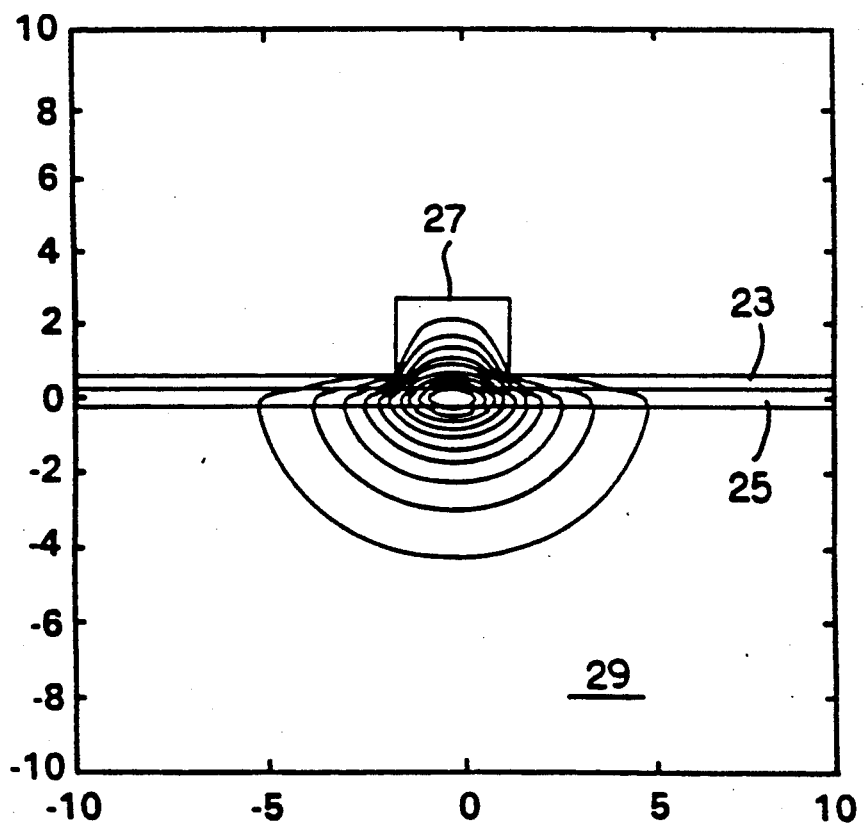

The primary effects of the rib's height ($h_r$) are illustrated by the sequence of modal shapes shown in FIGS. 11a-11d, in which the height ($h_r$) of the rib increases from the contour of FIG. 11a to the contour of FIG. 11d while all other parameters are held fixed. Here the lateral confinement of the mode increases noticeably from FIGS. 11a-11b, but beyond that remains approximately fixed with increasing height ($h_r$) of the rib 27. The upward vertical extent of the mode increases as well, essentially following the rib 27 from FIG. 11a to FIG. 11b. Between FIG. 11c and 11d, however, the mode grows very little vertically, thereby indicating that the rib 27 already exceeds the decay length substantially. There is of course a slight change in the modal refractive index ($N_m$) in region II of the waveguide from FIGS. 11a-11d, and therefore a slight change in decay length as well. The heights ($h_r$) of the rib 27 in FIGS. 11a-11d are 0.6, 1.1, 1.6 and 2.1 μm, respectively. The values of the remaining parameters are the same for all four contours and are as follows (in microns): (w)=5; ($h_{uc}$)=0.4; ($h_f$)=0.5; ($n_f$)=3.3700 and ($n_{uc}$)=($n_{lc}$)=3.3601.

vi. The Width (w) of the Rib

Figure 12A:
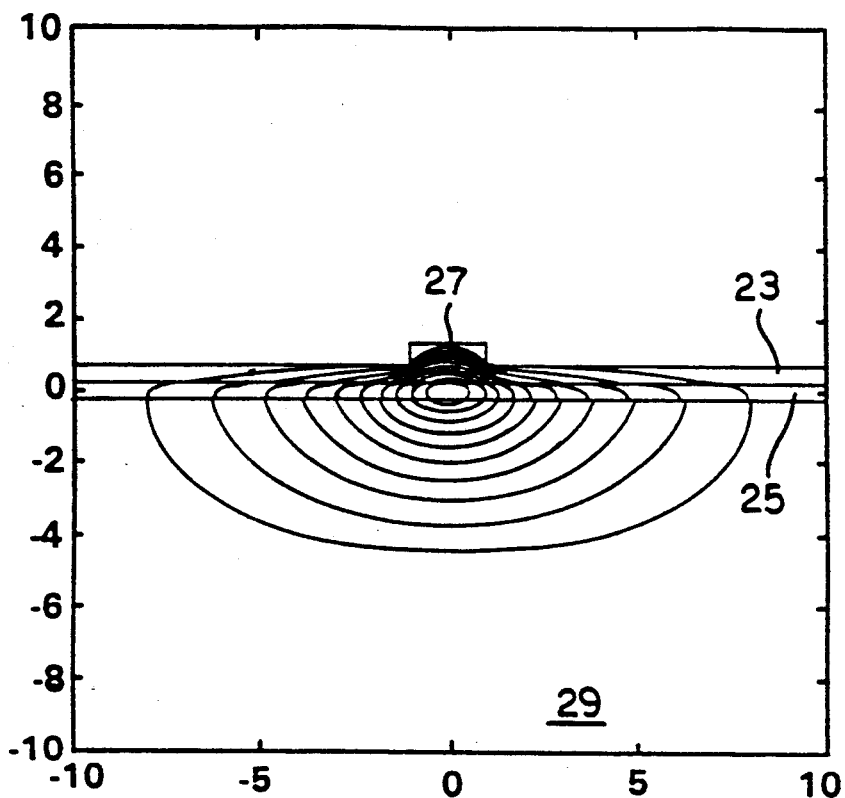
FIGS. 12a–12c illustrate effects of the rib's width (w) on the modal structure wherein only the width is varied.
Figure 12B:
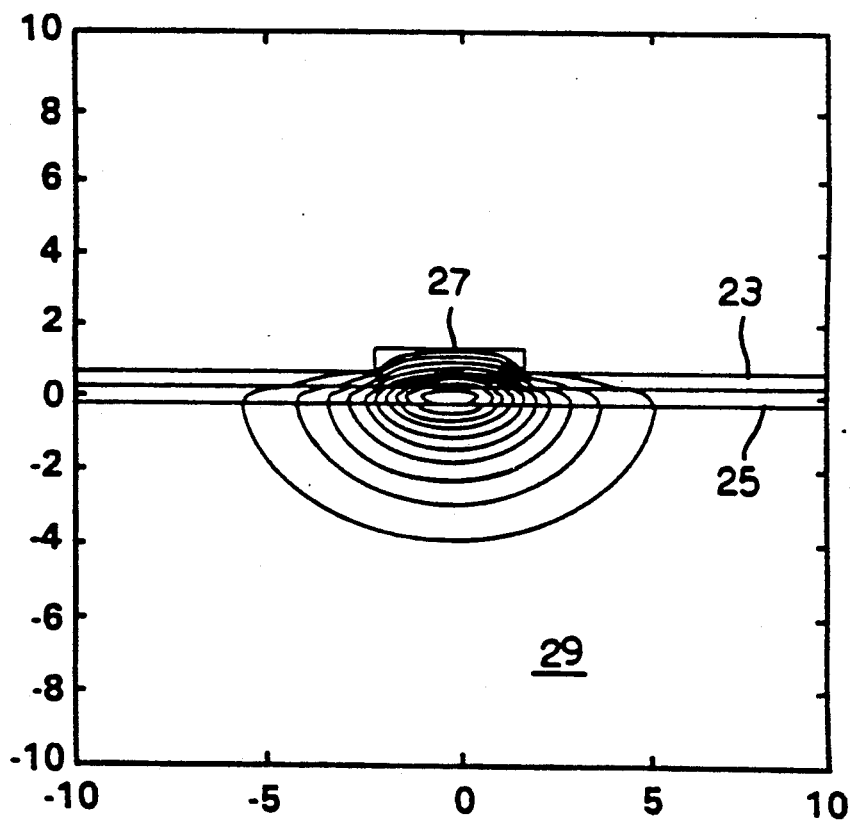
Figure 12C:
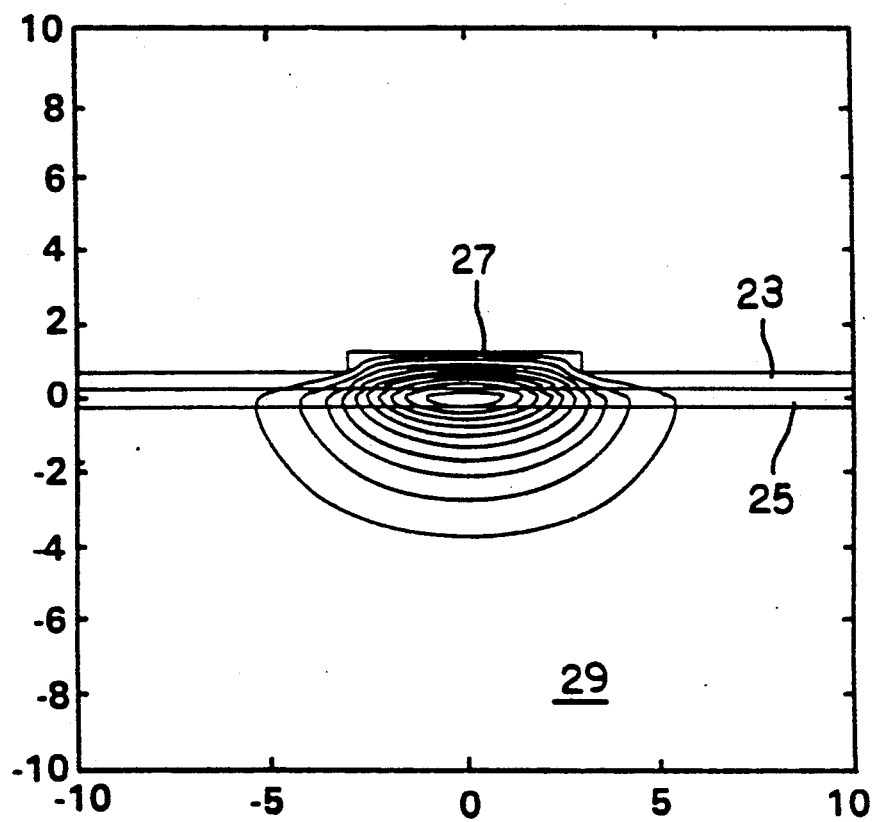

The effects of the width (w) of the rib 27 on the modal structure are illustrated in FIGS. 12a-12c, where (w) alone is varied. Here with no rib at all (i.e., (w) equals zero), the slab guide that results does not support a guided mode. The mode also remains cut off for relatively narrow ribs. As the width (w) of the rib 27 is increased, the mode that appears initially is very close to cutoff, the effective index ($n_{eff}$) of the region II differing from that of regions I and III in the fifth decimal place, and shows very weak lateral confinement. Lateral confinement steadily improves as the width (w) of the rib 27 increases, and the mode begins to acquire more the character of a rib mode than a slab mode. Further widening of the rib 27 induces little additional change in the general shape of the mode, but a second lateral mode can be supported at some larger width (w). In each of the contours of FIGS. 12a–12c, the value of the width (w) of the rib 27 is 2.0, 4.0, 6.0 μm, respectively. The remaining parameters are held constant and are as follows (in microns): $(h_r)=0.6$; $(h_{uc})=0.4$; $(h_f)=0.5$; $(n_f)=3.3700$; $(n_{uc})=(n_{lc})=3.3601$.

vii. Other Parameters

The overall width of the structure typically should be sufficient to suppress any effects due to finite size, although boundary conditions do influence the modes computed for a model system with finite width. It is possible also to consider guides in which the indices $(n_{uc})$ and $(n_{lc})$ of the two cladding layers 23 and 29, respectively, are different. Such cases may be handled with the arguments developed above. Finally, the rib 27 may be capped by a thin layer of doped material or by a metal contact (not shown). If any mode in such a structure penetrates to the top of the rib, then the additional layers can be added to the computational model as needed.

The modes generally are well confined vertically for index differences of approximately one percent and more, and in such instances a height $(h_{lc})$ of the lower cladding 29 of 1 μm usually is adequate. Thicker cladding below the core 25 may be required to accommodate modes optimized for coupling to the fiber 31. Such quasi-circular modes typically are very close to cutoff, and these often are supported only when the difference between core and upper cladding indices $(n_f)$ and $(n_{uc})$ is very small. For small but realistic values of the index difference, lower cladding thicknesses $(n_{lc})$ of 4 μm or more may be needed. As a preliminary guideline for fabrication of such waveguides, the lower cladding is required to be sufficiently thick so that no more than two (2) percent of the total integrated intensity of the mode travels in the substrate.

III. OPTIMIZING THE PARAMETERS TO MATCH MODAL STRUCTURE OF WAVEGUIDE TO THAT OF THE OPTICAL FIBER

For the waveguide 21 to propagate light at a wavelength (λ) of 0.85 μm, the layers may be made of AlGaAs. For example, the upper and lower claddings 23 and 29 may be fabricated from $Al_{0.4}Ga_{0.6}As$ and the core from $Al_{0.3}Ga_{0.7}As$, for which the indices $(n_{lc})$ and $(n_f)$ are expected to be 3.3601 and 3.4165, respectively. Although these values provide good propagation characteristics, they promote strong vertical confinement, with the mode contained almost entirely within the core. The rib 27, typically has a width (w) of 3 or 5 μm, a height $(h_r)$ of 0.4 to 0.6 μm and is removed from the core 25 by a height $(h_{uc})$ of the upper cladding layer 23 of 0.4 to 0.6 μm. This removal from the core 25, combined with the weak evanescent fields in the cladding 23, lessens the ability of the rib 27 to confine the light laterally. The result often is a mode whose cross-section resembles a highly eccentric ellipse with minor axis of about 0.5 μm and major axis of 6 to 10 μm. The fundamental mode of a circular fiber, however, regardless of the fiber's diameter and refractive indices, is circularly symmetric with a nearly Gaussian intensity profile as shown in FIGS. 3a–3b.

To see how these differences in shape between the single mode of the waveguide and that of the fiber prevent efficient fiber-waveguide coupling, one begins by writing the modes of the waveguide as $$u_j(x,y)\exp(i\beta_j z), \quad j=1, 2, \ldots \tag{12}$$

and the fundamental mode of the fiber as $$u_{fib}(x,y)\exp(i\beta_{fib} z). \tag{13}$$

With these expressions normalized to unity, $$\int |u_{fib}|^2 \, dx \, dy = \int |u_j|^2 \, dx \, dy = 1, \tag{14}$$

the expansion $$u_{fib}(x,y) = \Sigma a_j u_j(x,y) \tag{15}$$

then is valid at the input facet of the waveguide—i.e., where power from the fiber enters the waveguide. Since the waveguide modes are mutually orthogonal, the expansion coefficients $a_j$ are determined by the overlap integrals $$a_j = \int u_j^*(x,y) \, u_{fib}(x,y) \, dx \, dy. \tag{16}$$

The fraction of the power that couples into the fundamental waveguide mode (j=1), $$P_l = |a_l|^2, \tag{17}$$

thus attains its maximum value of unity only when the fiber and waveguide modes are identical. The more dissimilar the modes, the larger are the coupling losses. The problem of optimizing the coupling between waveguide and fiber consequently becomes a matter of adjusting the shapes of the two modes to achieve a better match.

Efficiency of coupling between the fundamental mode of the fiber 31 and any mode of the waveguide 21 is given by the square of the overlap integral (equation 16). For numerical evaluation, one calculates the modes of the waveguide 21 by the previously mentioned Fourier-series method, computing the values on the same 55 by 55 grid of points (20 μm by 20 μm) used to represent the field of the fiber 31. As with the fiber 31, the modal amplitude is set to zero on the boundaries of the grid. Both the normalization integral and the overlap integral can be evaluated simply by summing the products of the two fields at each grid point.

Since the fundamental mode of the waveguide 21 necessarily is symmetric in the lateral direction, maximum coupling with the fiber 31 is obtained when the fiber's axis lies somewhere on the vertical centerline of the waveguide, y equals 0. One can determine the maximum coupling by translating the fiber's field along this line one grid point at a time and evaluating the overlap at each position. The maximum generally lies within two or three grid points (about 1 μm) of the center of the core 25.

The second mode of the waveguide 21, if one exists, is antisymmetric with respect to the vertical center line of the waveguide and thus will not couple to the fiber 31 placed with its axis anywhere along this line. Coupling will occur, however, as the fiber 31 is moved parallel to the y axis.

A. Implementing A Numerical Solution

Figure 13:
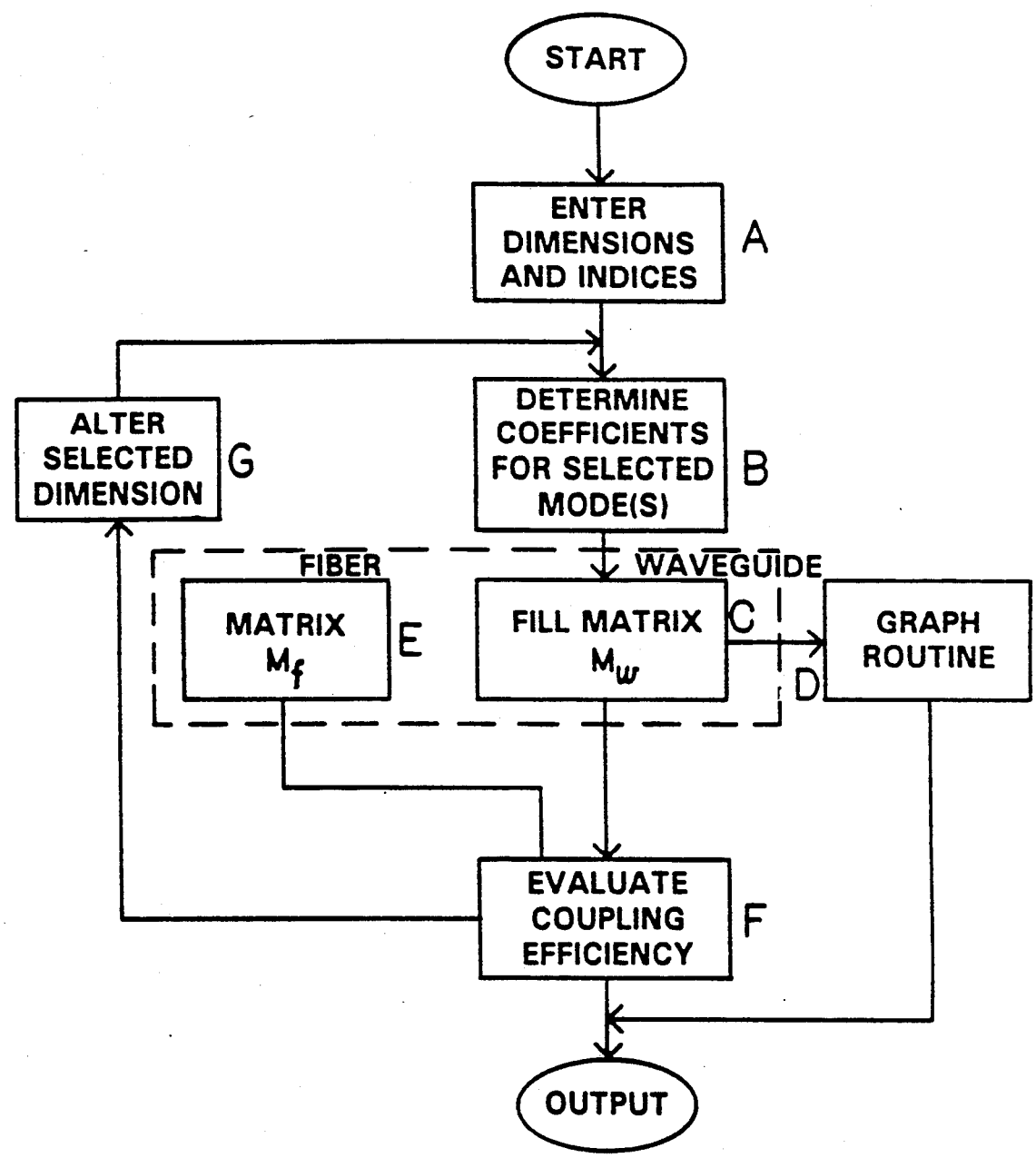
FIG. 13 is a flow diagram of a process for identifying a set of values for the structural and compositional parameters of a raised-rib waveguide that optimizes coupling of the guide to an optical fiber.

Referring to the flow diagram of FIG. 13, optimization of the compositional and structural parameters of a raised-rib waveguide utilizes the programs RIB2DIM and PAT55 discussed in Section II in order to implement steps A, B, C and D of the diagram. The steps A and B consisting of initializing the values of the structural and compositional parameters and determining the eigenvector coefficients for each point of the 55 by 55 grid to be plotted are accomplished by the program RIB2DIM, attached hereto as Appendix C. The amplitude of the mode at each point of the grid is provided in step C by the program PAT55 of Appendix D. A matrix $M_w$ of the amplitudes is filled in step C for the purpose of comparing the modal shape of the raised-rib waveguide with that of the optical fiber. Plotting of the mesh plot and contour map from the amplitudes is done by the commercial program PC-MATLAB, previously mentioned in Section II.

In order to optimize the values of the structural and compositional parameters of the raised-rib waveguide so as to achieve a low-loss coupling with a commercially available optical fiber, the modal amplitudes of a selected fiber are determined for the 55 by 55 grid (as discussed in Section II) and entered into a matrix $M_f$ as indicated by step E in FIG. 13. With both the matrices $M_w$ and $M_f$ filled with values, the coupling efficiency for the two waveguides described by the values in the matrices $M_w$ and $M_f$ can be determined quite simply in step F by summing the products of the two fields at each grid point.

From information garnered in the experiments of Section III, a parameter of the waveguide 21 is selected in step G whose value has the greatest effect on the modal shape. The selected value is varied while the others are held constant and the steps B, C, D, F and G are repeated. Once the value is identified that provides the optimum coupling and still propagates the selected mode, the value of the parameter is fixed at the identified value and another parameter is chosen as a variable. Preferably, the parameters are selected as variables in an order of decreasing effect on the modal shape. The following is a particular example.

B. An Example of Optimization

The process of optimization begins by selecting as a variable the one parameter of the waveguide 21 for which the shapes of the fundamental mode is most sensitive at the selected wavelength ($\lambda$) of 0.85 $\mu$m. An initial set of values is selected for the guide 21 that provide a reference point from which improvements in coupling efficiency may be measured in accordance with the invention. In the present example, the initial value of the parameters are (w)=5.0, $(h_r)$=0.6, $(h_{uc})$=0.4, $(h_f)$=0.5, ($\mu$)=0.85 $\mu$m, $(n_f)$=3.4165, and $(n_{lc})=(n_{uc})$=3.3601, the latter three values corresponding to a $Al_xGa_{l-x}As$ composition for the core 25 and upper and lower claddings 23 and 29 of x equals 0.3 and 0.4, respectively, as previously mentioned. Computation of the overlap integral (equation 16) gives coupling efficiencies of 34% (−4.66 dB insertion loss) for the 5-$\mu$m fiber and 27% (−5.76 dB) for the 9-$\mu$m fiber.

Figure 14:
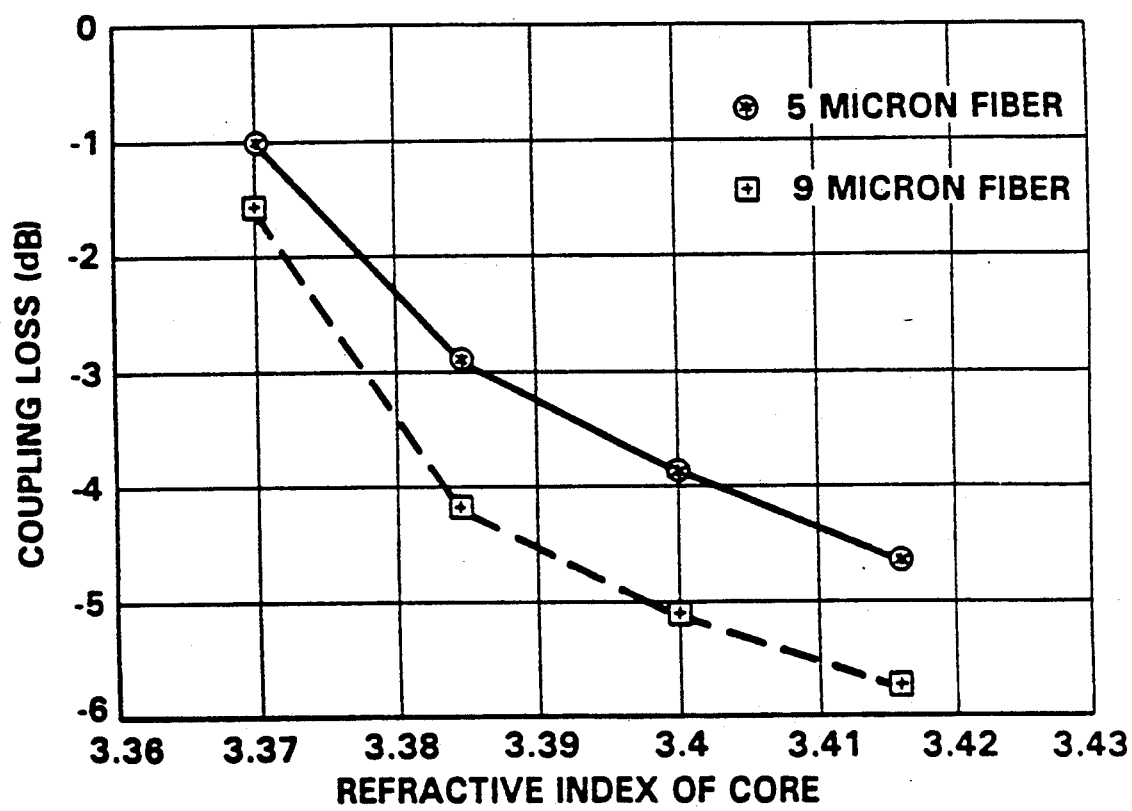
FIG. 14 is a line graph of the estimated power loss between a particular waveguide and 5 and 9 μm fibers, wherein coupling loss (dB) versus refractive index of the core is plotted.

To improve the coupling in accordance with the invention, one first decreases the refractive index $(n_f)$ of the core 25, thereby causing the mode to spread vertically. The spread is mainly into the lower cladding since the extent of the mode upward is essentially limited by the interface with air. As the difference decreases between the indices of the core $(n_f)$ and the upper cladding $(n_{uc})$, the shape of the mode becomes increasingly circular, and the computed coupling losses decrease correspondingly as shown in FIG. 14. The efficiency reaches 80% (−0.99 dB insertion loss) for the 5-$\mu$m fiber and 69% (−1.61 dB) for the 9-$\mu$m fiber at an index $(n_f)$ equal to 3.370. The improvement in efficiency cannot be continued further without changing some other parameter of the waveguide 21, since the mode already has a modal refractive index $(N_m)$ for its cutoff wavelength of only 3.3607, very close to that of the upper and lower claddings. With further reduction in the index $(n_f)$ of the core, this mode is cut off and ceases to exist at approximately an index $(n_f)$ equal to=3.368.

The second most sensitive parameter for effecting changes to the modal shape is the height $(h_f)$ of the core 25. Reducing the initial value of the height $(h_f)$ causes the mode to spread vertically and generally become more circular. All parameters in this sequence are fixed except the height $(h_f)$ of the core, which decreases. The fixed values are the same as the initial values, except the value of the index $(n_f)$ of the core 25 has been amended to the optimized value of 3.370.

Coupling losses to 5-$\mu$m and 9-$\mu$m fibers are shown in the table I below.

TABLE III

| core height ($\mu$m) | coupling loss (dB) | |
|---|---|---|
| $h_f$ | 5-$\mu$m | 9-$\mu$m |
| 0.7 | −1.54 | −2.47 |
| 0.5 | −0.99 | −1.61 |
| 0.4 | −0.83 | −0.89 |

The value of the other parameters for the waveguides 21 of TABLE I are held constant and are: w=5, $h_c$=0.4, $h_r$=0.6, $n_f$=3.37, $n_c$=3.3601. The mode for the waveguide having a core height $(h_f)$ of 0.4 $\mu$m has a modal refractive index $(N_m)$ of 3.3602, which is almost at cutoff. Therefore, at the height $(h_f)$ of the core 25 equal to 0.3 and below, there are no guided modes in this structure. Excellent coupling may be obtained with values of the height $(h_f)$ equal to 0.3, however, for guides where the refractive index $(n_f)$ of the core 25 ranges between 3.371 and 3.378. Just by concerted adjustment of both the height $(h_f)$ of the core 25 and the difference between the refractive indices $(n_f)$ and $(n_{uc})$ of the core 25 and upper cladding 23, respectively, leaving the other parameters untouched, one can reduce theoretical insertion losses from−5.76 dB to −0.89 dB and from −4.66 dB to −0.83 dB for the 9-$\mu$m and 5-$\mu$m fibers, respectively.

Figure 15:
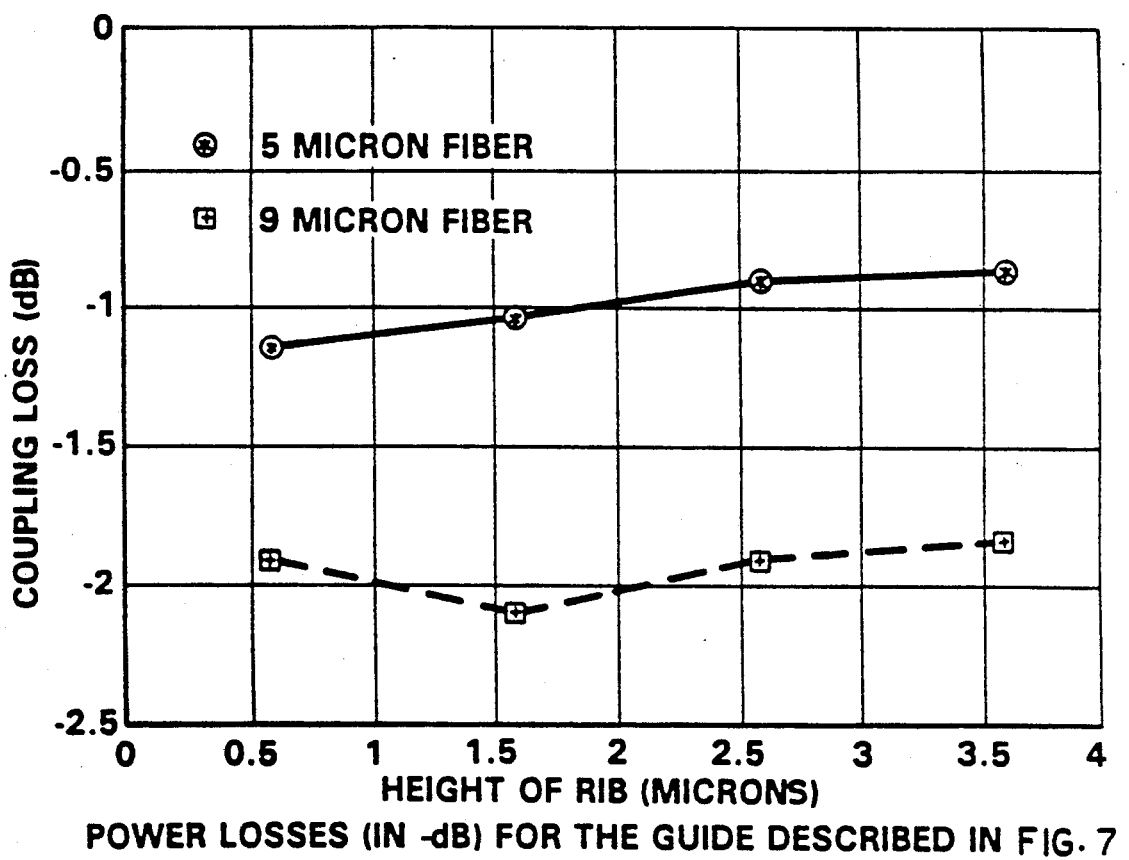
FIG. 15 is a line graph of coupling loss (dB) versus height of rib for both 5 and 9 μm fibers.

The remaining parameters of the waveguide 21 also may be adjusted to improve coupling. Most effective among these is the height $(h_r)$ of the rib. FIG. 15 shows the corresponding insertion losses for the guide 21 where all parameters but the height $(h_r)$ of the rib 27 are fixed. All of these guides share the parameter values of (w)=5.0, $(h_f)$=0.3, $(h_{uc})$=0.4, $(n_f)$=3.3775, $(n_c)$=3.3601, where the values of $(h_f)$ and $(n_f)$ have been previously optimized.

As the height $(h_r)$ of the rib increases, the contour lines of the field extend further into the rib 27 and, at the same time, the pattern shrinks laterally because of the increased effective index $(n_{eff})$ below the rib with respect to the effective indices in regions I and III (FIG. 5). These two effects cause the mode to become generally more circular and therefore better able to couple to the fibers, although a counter-example is provided between the rib heights $(h_r)$ of 0.6 and 1.6 $\mu$m. Here the coupling to the 9-$\mu$m fiber actually becomes worse, because the wider field pattern for the waveguide 21 with the 0.6 $\mu$m rib more closely matches the wider fiber than does the narrower pattern created by the waveguide with a rib width (w) of 1.6 μm. Any effect of the height ($h_r$) of the rib 27 also is limited, of course, by the extent of the evanescent field, for the rib is able to effect little marginal change once its height substantially exceeds the decay length of the mode. These decays can be prolonged, though, since the modes under consideration usually are close to their cutoff points.

Figure 16:
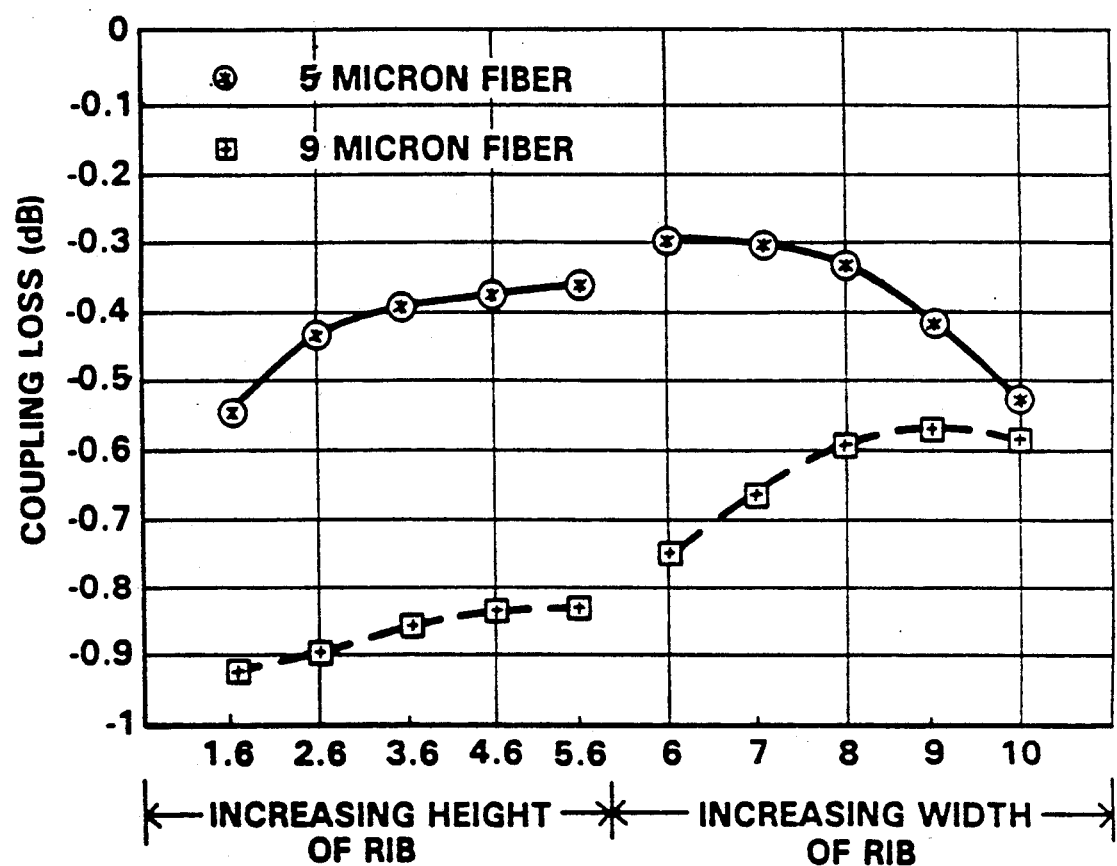
FIG. 16 is a multiple line graph of coupling loss (dB) verses rib height/width.

The several effects exhibited above may be combined to yield still better coupling efficiencies, of which one example is shown in FIG. 16. Here the difference in refractive indices again is relatively small ($n_f=3.3715$, $n_{uc}=3.3601$) and the core is narrow ($h_f=0.3$ μm). The height ($h_{uc}$) of the upper cladding 23 is 0.4 μm. The first five points of the curves in FIG. 16 correspond to a width (w) of the rib 27 equal to 5.0 μm, with the height ($h_r$) increasing from 1.6 μm to 5.6 μm in steps of 1 μm. For the last five points, the rib's height ($h_r$) has been fixed at 5.6 μm, while its width is increased from 6.0 to 10.0 μm in steps of 1 μm. Coupling losses to either the 5 or 9 μm fiber are less than $-1.0$ dB over the entire curve and, for the 5 μm fiber, an optimum value of $-0.29$ dB loss is obtained. A second lateral mode also exists for the last guide in this sequence (w=10), whereas no guided mode is supported when the width (w) of the rib 27 equals 5 μm and its height ($h_r$) equals 0.6 μm (before the first point on the graph).

The coupling efficiencies cited above are all "best" values, obtained by moving the fiber 31 vertically along the centerline of the waveguide until maximum coupling is achieved. Often this maximum coupling occurs with the fiber axis slightly below the center of the guiding film, but practical difficulties in attaching fibers naturally prevent the precise positioning of the fiber. It is therefore desirable to estimate how much leeway exists and understand what penalties in lost power will be incurred by misalignment.

The computational procedure is straightforward. Both the mode of the fiber 31 and the mode of the waveguide 21 are represented on the 55 by 55 grid mentioned above, the points spaced at approximately 0.37 μm. The overlap of the two fields is computed by multiplying their values at each grid point and summing these products over the grid points. The modal pattern of the fiber then is shifted by one grid point in either the x or y direction, and the process repeated. Both fields are taken strictly zero outside the original 20 μm by 20 μm square.

Figure 17A:
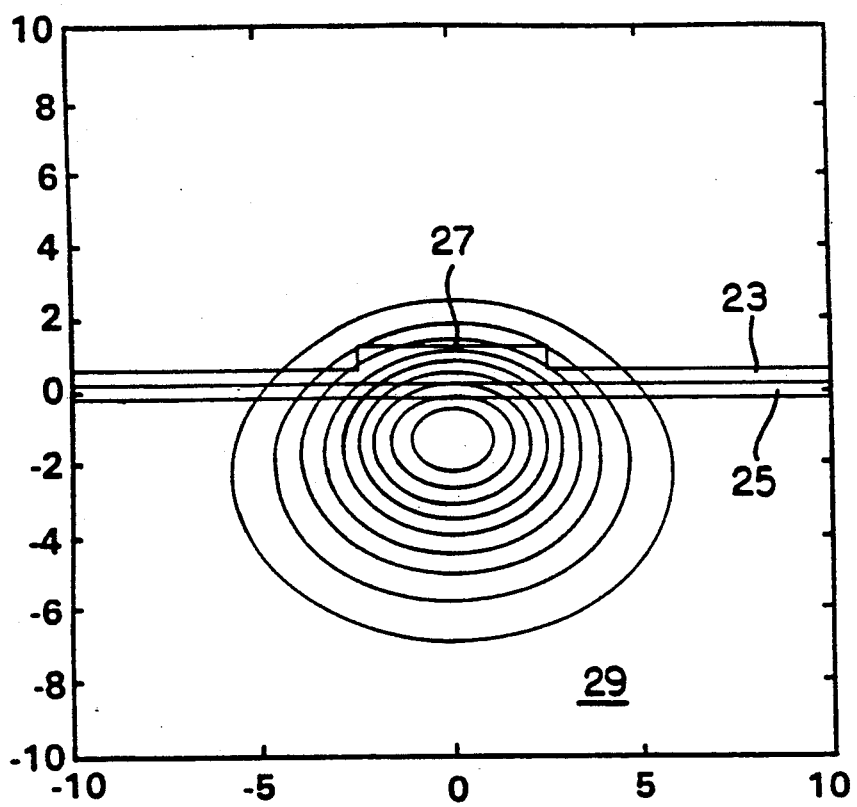
FIGS. 17a and 17b are contour plots regarding alignment of the waveguide and fiber.
Figure 17B:
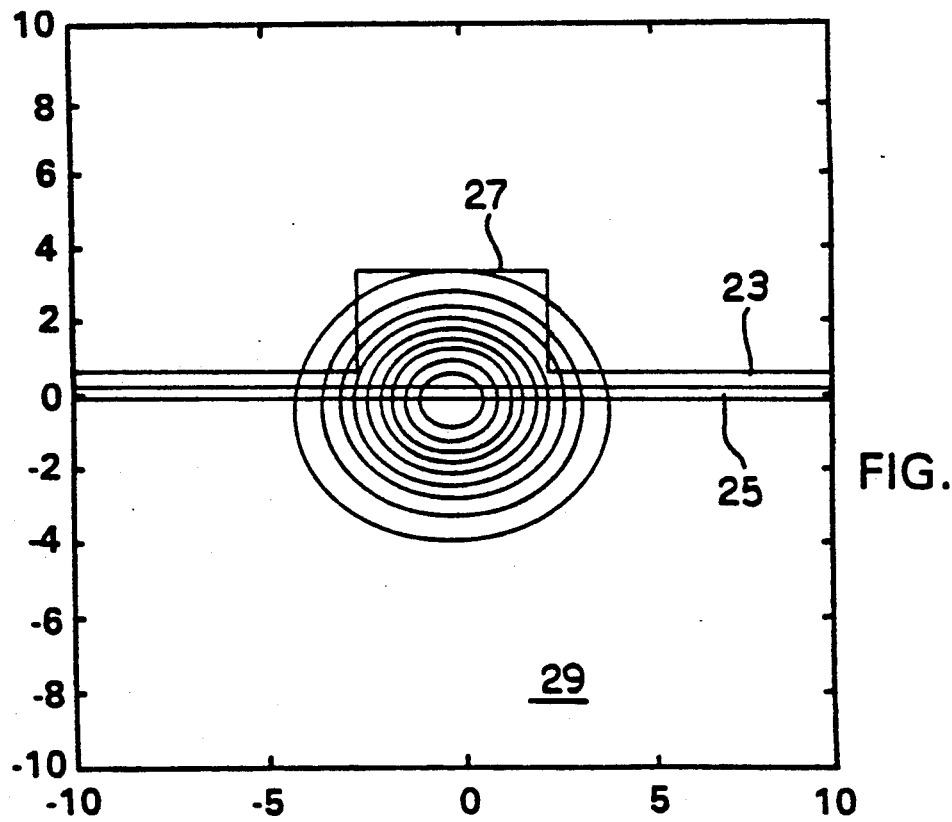

Two illustrations of alignment are given in FIGS. 17a and 17b. In both, 90% of the peak coupling is realized if the fiber axis lies within the innermost contour; 80% is achieved within the next contour, and so forth. FIG. 17a shows the coupling of the 5-μm fiber to the guide 21 having the parameters of the waveguide in TABLE I, with ($h_f$)=0.4 μm. The mode profile is "semicircular" and most of the power is carried in the lower cladding. The alignment contours confirm that optimum coupling to this mode is achieved when the center of the fiber is approximately 1.3 μm below the center of the guiding film, with 90% of optimum achieved inside a distorted circle of approximately 1.7 μm diameter.

The second illustration, FIG. 17b, shows alignment for a 5-μm fiber coupled to the guide of FIG. 15, with the height ($h_r$) of the rib 27 equal to 1.6 μm. Here the fundamental mode is more nearly circular with its intensity distributed approximately equally above and below the guiding film. The map of coupling efficiency correspondingly shows roughly circular areas of equal coupling, centered on the core 25 of the waveguide 21. The area corresponding to 90% of maximum coupling efficiency is about 1.5 μm in diameter, typical for the range of guides examined herein.

From the foregoing, it will be appreciated that the invention provides for a raised-rib waveguide 21 whose structural and compositional parameters have values that optimize the coupling efficiency of the waveguide to an optical fiber such as commercially available 5 or 9-μm fiber. In the exemplary embodiment, a raised-rib waveguide 21 is described whose structural and compositional parameters are optimized for coupling to 5 and 9-μm fibers at a wavelength (λ) of 0.85 μm. Using the same methodology as disclosed herein to identify the exemplary embodiment, other embodiments of raised-rib waveguides may be identified for other wavelengths (λ) such as 1.3 μm.

APPENDIX A

```
C       M. MUNOWITZ
C       AMOCO TECHNOLOGY COMPANY
C       FIRST WRITTEN: OCTOBER, 1989

C       CALCULATES MODES OF OPTICAL FIBER USING FOURIER-GRID METHOD.

C       SOLVES TWO-DIMENSIONAL SCALAR WAVE EQUATION;
C       EIGENVALUE EQUATION IS:

C       H.E(X,Y) = BETASQ*E(X,Y)    ( . SIGNIFIES THAT "H" OPERATES
C                                     ON "E"; * INDICATES SIMPLE
C                                     MULTIPLICATION)

C       E(X,Y) IS THE SCALAR ELECTRIC FIELD.

C       H IS AN OPERATOR GIVEN BY

C              H = D2/DX2 + D2/DY2 + (N(X,Y)*WV)**2 ,
```

```
C       WHERE D2/DX2 + D2/DY2 DENOTES THE TRANSVERSE LAPLACIAN,
C       N(X,Y) DENOTES THE REFRACTIVE INDEX OF THE STRUCTURE
C       IN CROSS-SECTION, AND WV IS THE VACUUM WAVEVECTOR
C       (2.*PI/WAVELENGTH).

C       THE EIGENVALUE "BETASQ" IS THE SQUARE OF THE PROPAGATION
C       CONSTANT FOR EACH BOUND MODE.

C       THE TERMINOLOGY "KINETIC ENERGY" AND "POTENTIAL ENERGY" IS USED
C       TO EMPHASIZE THE SIMILARITY TO THE SCHROEDINGER EQUATION.

C       ALL SOLUTIONS ARE FOUND ON A GRID.

C                       <--------- XTOTAL---------->
C                       *****************************
C                       *      (NTOTX POINTS)       *
C                       *                           *
C                       *                           *
C                       *                           *  YTOTAL
C                       *                           *
C                       *                           *  (NTOTY POINTS)
C                       *                           *
C                       *                           *
C                       *                           *
C                       *****************************

C       REFERENCE: M. MUNOWITZ AND D.J. VEZZETTI, "APPLICATION OF THE
C                  FOURIER-GRID METHOD TO GUIDED-WAVE PROBLEMS,"
C                  JOURNAL OF LIGHTWAVE TECHNOLOGY, VOL. 8, PP. 889-893
C                  (1990)

C       WRITTEN IN SINGLE PRECISION. PREFERABLY FOR USE ON A CRAY

PARAMETER(NXMAX=55,NYMAX=55,NMAX=NXMAX*NYMAX,MXEVAL=50)
        COMPLEX MATRIX(NMAX)
        REAL H(NMAX,NMAX),EVEC(NMAX,MXEVAL),V(NXMAX,NYMAX)
        REAL EVAL(MXEVAL),X(NXMAX),Y(NYMAX),WORK(8*NMAX)
C---------------FIRST READ DIMENSIONS AND NUMBER OF POINTS--------------

C------REFRACTIVE-INDEX PROFILE AND WAVELENGTH WILL BE SET LATER BY A----
C------------------------CALL TO A SPECIFIC SUBROUTINE------------------

WRITE(*,*) ' ENTER X AND Y DIMENSIONS:'
        WRITE(*,*)
        WRITE(*,*) ' XTOTAL >> '
        READ(*,*) XTOTAL
        WRITE(*,*) ' YTOTAL >> '
        READ(*,*) YTOTAL
        WRITE(*,*)

WRITE(*,*) ' ENTER NUMBER OF POINTS IN X AND Y DIMENSIONS:'
        WRITE(*,*) ' NTOTX >> '
        READ(*,*) NTOTX
        WRITE(*,*) ' NTOTY >> '
        READ(*,*) NTOTY
        WRITE(*,*)

C........CHECK THAT NTOTX AND NTOTY DO NOT EXCEED ALLOWABLE LIMITS......

IF(NTOTX.GT.NXMAX) THEN
           WRITE(*,*) ' CURRENT MAXIMUM ALLOWED VALUE OF NTOTX = ',NXMAX
           STOP
```

```
      ELSE IF(NTOTY.GT.NYMAX) THEN
        WRITE(*,*) ' CURRENT MAXIMUM ALLOWED VALUE OF NTOTY - ',NYMAX
        STOP
      END IF

C..............CHECK THAT NTOTX AND NTOTY ARE BOTH ODD...............

IF((2*(NTOTX/2)).EQ.NTOTX) THEN
        WRITE(*,*) 'NTOTX - ',NTOTX
        WRITE(*,*) ' 2*NTOTX/2 - ',(2*(NTOTX/2))
        WRITE(*,*) ' NUMBER OF X POINTS MUST BE ODD'
        STOP
      ELSE
        FNTX=FLOAT(NTOTX)
        DELX=XTOTAL/(FNTX-1.)
        NX=(NTOTX-1)/2
        XMIN=-0.5*XTOTAL
      END IF

IF((2*(NTOTY/2)).EQ.NTOTY) THEN
        WRITE(*,*) ' NUMBER OF Y POINTS MUST BE ODD'
        STOP
      ELSE
        FNTY=FLOAT(NTOTY)
        DELY=YTOTAL/(FNTY-1.)
        NY=(NTOTY-1)/2
        YMIN=-0.5*YTOTAL
      END IF

C-------------------------BEGIN CALCULATION-------------------------
      PI=4.*ATAN(1.)
      TWOPI=2.*PI
      NTOTAL=NTOTX*NTOTY
      FNT=FLOAT(NTOTAL)
      K=1
      DO 90 I=1,NTOTX
      XINDEX=FLOAT(I)
      DO 80 J=1,NTOTY
      YINDEX=FLOAT(J)
      MATRIX(K)=CMPLX(XINDEX,YINDEX)
      K=K+1
  80  CONTINUE
  90  CONTINUE

C---------------FIRST COMPUTE "POTENTIAL ENERGY"-------------------

WRITE(*,*) 'COMPUTING "POTENTIAL ENERGY" (REFRACTIVE INDEX)'

NX1=(NTOTX-1)/2
      NCTRX=NX1+1
      X(NCTRX)=0.
      DO 100 I=1,NX1
      X(NCTRX+I)=FLOAT(I)*DELX
      X(NCTRX-I)=-FLOAT(I)*DELX
 100  CONTINUE
      NY1=(NTOTY-1)/2
      NCTRY=NY1+1
      Y(NCTRY)=0.
      DO 101 I=1,NY1
      Y(NCTRY+I)=FLOAT(I)*DELY
      Y(NCTRY-I)=-FLOAT(I)*DELY
 101  CONTINUE

C---------CALL SUBROUTINE TO SET UP REFRACTIVE INDEX FOR FIBER---------
```

```
C.....MATRIX "H" IS RETURNED INITIALLY WITH CONTRIBUTION "V"...........

C.....ALTERNATIVELY CAN SOLVE FOR ANY GEOMETRY (E.G. RECTANGULAR........
C...WAVEGUIDE) BY SUBSTITUTING APPROPRIATE SUBROUTINE TO COMPUTE V......

CALL FIBER2(X,Y,DELX,DELY,NTOTX,NTOTY,MATRIX,V,H,ELOW,EHIGH,WV,
     1 NMAX,NXMAX)

B1=SQRT(-ELOW)/WV
      B2=SQRT(-EHIGH)/WV
      WRITE(*,*) 'RANGE OF EFFECTIVE INDICES = ',B1,' TO ',B2

C----------NOW ADD "KINETIC ENERGY" TO OBTAIN COMPLETE HAMILTONIAN----------
C----------(THIS CONTRIBUTION IS THE SAME FOR ALL STRUCTURES)----------

WRITE(*,*)
      WRITE(*,*) 'COMPUTING "KINETIC ENERGY"  (LAPLACIAN)'

TXPART=(TWOPI/XTOTAL)**2
      TYPART=(TWOPI/YTOTAL)**2
      TWOPNX=TWOPI/FNTX
      TWOPNY=TWOPI/FNTY
      TWONX=2./FNTX
      TWONY=2./FNTY
      DO 400 I=1,NTOTAL
      IX=AINT(REAL(MATRIX(I)))
      IY=AINT(AIMAG(MATRIX(I)))
      DO 300 J=1,NTOTAL
      JX=AINT(REAL(MATRIX(J)))
      JY=AINT(AIMAG(MATRIX(J)))

IF(IY.EQ.JY) THEN
         AIJX=FLOAT(IX-JX)*TWOPNX
         TX=0.
         DO 200 L=1,NX
         FL=FLOAT(L)
         TX=TX+COS(FL*AIJX)*TXPART*FL*FL
 200     CONTINUE
         TX=TWONX*TX
         H(I,J)=H(I,J)+TX
      END IF

IF(IX.EQ.JX) THEN
         AIJY=FLOAT(IY-JY)*TWOPNY
         TY=0.
         DO 201 L=1,NY
         FL=FLOAT(L)
         TY=TY+COS(FL*AIJY)*TYPART*FL*FL
 201     CONTINUE
         TY=TWONY*TY
         H(I,J)=H(I,J)+TY
      END IF
 300  CONTINUE
 400  CONTINUE

C----------FIND EIGENVALUES AND EIGENVECTORS OF MATRIX "H"----------
C----------WITHIN SPECIFIED RANGE----------

WRITE(*,*) 'DIAGONALIZING HAMILTONIAN'

C...IMSL SUBROUTINE "E2FSF" USED HERE (CAN BE REPLACED IF NECESSARY)....

CALL E2FSF(NTOTAL,MXEVAL,H,NMAX,ELOW,EHIGH,NEVAL,EVAL,EVEC,
     1 NMAX,H,WORK,IWK)
```

```
C------------------------WRITE OUTPUT TO DISK FILES----------------

C....................NO. OF ROOTS - NEVAL.......................

C..............EIGENVALUES ARE WRITTEN TO FILE 'eval.fgh'..............
C...EIGENVECTORS ARE WRITTEN TO FILES 'evec01.fgh', 'evec02.fgh', etc...
C......................FOR EACH OF THE NEVAL ROOTS...................

C.....OUTPUT FILES CAN BE CONVERTED TO MATLAB FORMAT USING UTILITY......
C............................PROGRAM "EVEC"...........................

OUTFIL='evec    .fgh'
       WRITE(*,*) 'NUMBER OF EIGENVALUES = ',NEVAL
       WRITE(*,*) 'EIGENVALUES WRITTEN TO FILE eval.fgh'
       OPEN(1,FILE='eval.fgh')
       DO 8000 I=1,NEVAL
       EFFN=SQRT(-EVAL(I))/WV
       WRITE(1,*) I,EFFN
       WRITE(OUTFIL(5:    )05) I
 4005  FORMAT(I2.2)
       OPEN(2,FILE=OUTFIL)
       WRITE(2,*) '% EFFECTIVE INDEX = ',EFFN
       WRITE(2,*) NTOTAL,NTOTX,NTOTY
       DO 7000 J=1,NTOTAL
       IX=AINT(REAL(MATRIX(J)))
       JY=AINT(AIMAG(MATRIX(J)))
       WRITE(2,*) IX,JY,X(IX),Y(JY),EVEC(J,I)
 7000  CONTINUE
       CLOSE(2)
       WRITE(*,4010) I,OUTFIL
 4010  FORMAT('EIGENVALUE NO. ',I2,' WRITTEN TO FILE ',A10)
 8000  CONTINUE
       CLOSE(1)
       STOP
       END

C***********************************************************************

C      SUBROUTINE FIBER2(X,Y,DELX,DELY,NTOTX,NTOTY,MATRIX,V,H,ELOW,
C    1  EHIGH,WV,NMAX,NXMAX)

C      SETS UP REFRACTIVE-INDEX PROFILE FOR STEP-INDEX OPTICAL FIBER.
C      VALUES ARE COMPUTED ON A GRID OF NTOTX BY NTOTY POINTS.
C      CAN BE EASILY MODIFIED FOR GRADED-INDEX FIBERS, NON-CIRCULAR
C      GEOMETRIES, ETC.

C      WITH PARAMETER (NAVG=2), VALUE OF INDEX AT EACH POINT (X,Y) IS
C      OBTAINED AS AN AVERAGE OVER 9 POINTS:

C           (X-DELX2,Y+DELY2)   (X,Y+DELY2)   (X+DELX2,Y+DELY2)

C           (X-DELX2,Y)         (X,Y)         (X+DELX2,Y)

C           (X-DELX2,Y-DELY2)   (X,Y-DELY2)   (X+DELX2,Y-DELY2)

C      DELX2 = DELX/2; DELY2 = DELY/2

C      ARGUMENTS:

C      X: ARRAY OF X COORDINATES (INPUT)

C      Y: ARRAY OF Y COORDINATES (INPUT)

C      DELX, DELY: GRID SPACING (INPUT)
```

```
C       NTOTX,NTOTY: NUMBER OF GRID POINTS (INPUT)

C       MATRIX: COMPLEX ARRAY OF NTOTX BY NTOTY POINTS, USED TO
C               STORE SUBSCRIPTS FOR THE "HAMILTONIAN" MATRIX.
C               SET IN MAIN PROGRAM (INPUT)

C       V: TWO-DIMENSIONAL REAL MATRIX GIVING VALUES OF
C          -(WV*REFRACTIVE INDEX)**2 AT EACH POINT ON THE
C          SPATIAL GRID. ALLOCATED IN MAIN PROGRAM AS V(NXMAX,NYMAX);
C          NTOTX BY NTOTY VALUES ACTUALLY USED (OUTPUT)

C       H: TWO-DIMENSIONAL REAL MATRIX ALLOCATED IN MAIN PROGRAM AS
C          H(NMAX,NMAX); NTOTX*NTOTY BY NTOTX*NTOTY VALUES ACTUALLY
C          USED.  FULL     IX H = T + V, WHERE T (THE "KINETI   ERGY")
C          TERM, PERTAIN.  .O THE LAPLACIAN OPERATOR, AND
C          V (THE "POTENTIAL ENERGY" TERM) PERTAINS TO THE REFRACTIVE
C          INDEX. ONLY THE "V" CONTRIBUTION IS COMPUTED BY THIS
C          SUBROUTINE.

C          SUBSCRIPTS ARE ORDERED TO CONFORM TO CONVENTION DESCRIBED IN:
C          M. MUNOWITZ AND D.J. VEZZETTI, J. LIGHTWAVE TECH., VOL. 8,
C          PP. 889-893 (1990).

C       ELOW,ELOW: LOWER AND UPPER LIMITS FOR EIGENVALUES
C                  CORRESPONDING TO BOUND MODES (OUTPUT)

C       WV: WAVEVECTOR; 2.*PI/WAVELENGTH (OUTPUT)

C       NMAX: LEADING DIMENSION OF MATRIX "H" AS ALLOCATED IN
C             MAIN PROGRAM; NMAX = NXMAX*NYMAX (INPUT)

C       NXMAX: LEADING DIMENSION OF MATRIX "V" AS ALLOCATED IN
C              MAIN PROGRAM (INPUT)

SUBROUTINE FIBER2(X,Y,DELX,DELY,NTOTX,NTOTY,MATRIX,V,H,ELOW,
     1  EHIGH,WV,NMAX,NXMAX)
        PARAMETER (NAVG=2,NAVG1=NAVG+1)
        COMPLEX MATRIX(*)
        REAL X(*),Y(*),H(NMAX,NMAX),V(NXMAX,*),XA(NAVG1),YB(NAVG1)
        TWOPI=8.*ATAN(1.)

C================SET PARAMETERS FOR STEP-INDEX FIBER================

C       CLAD = REFRACTIVE INDEX OF CLADDING
C       CORE = REFRACTIVE INDEX OF CORE
C       AIR = REFRACTIVE INDEX OUTSIDE OF CLADDING (TYPICALLY AIR; = 1)
C       RCORE = RADIUS OF CORE
C       RCLAD = RADIUS OF CLADDING (ONE-HALF OUTER DIAMETER OF FIBER)
C       WL = WAVELENGTH

C...................SAMPLE SET OF PARAMETERS...................

C       CLAD=1.4528
C       CORE=1.0036*CLAD
C       AIR=1.0
C       RCORE=2.5
C       RCLAD=62.5
C       WL=0.85

WRITE(*,*) ' ENTER REFRACTIVE INDEX OF CLADDING'
        READ(*,*) CLAD
        WRITE(*,*) ' ENTER REFRACTIVE INDEX OF CORE'
        READ(*,*) CORE
        WRITE(*,*) ' ENTER REFRACTIVE INDEX OUTSIDE OF CLADDING'
```

```fortran
      READ(*,*) AIR
      WRITE(*,*) ' ENTER RADIUS OF CORE'
      READ(*,*) RCORE
      WRITE(*,*) ' ENTER RADIUS OF CLADDING'
      READ(*,*) RCLAD
      WRITE(*,*) ' ENTER WAVELENGTH'
      READ(*,*) WL WV=TWOPI/WL
      WVSQ=WV**2
      CLAD2=CLAD**2
      CORE2=CORE*CORE
      DELX2=0.5*DELX
      DELY2=0.5*DELY
      FNAVG=FLOAT(NAVG)
      FN2=FLOAT(NAVG1*NAVG1)
      DELXX=DELX/FNAVG
      DELYY=DELY/FNAVG DO 200 I=1,NTOTX
      XMIN=X(I)-DELX2
      DO 100 J=1,NTOTY
      YMIN=Y(J)-DELY2
      V(I,J)=0.
      DO 80 IA=1,NAVG1
      XA(IA)=XMIN+FLOAT(IA-1)*DELXX
      X2=XA(IA)**2
      DO 60 JB=1,NAVG1
      YB(JB)=YMIN+FLOAT(JB-1)*DELYY
      Y2=YB(JB)**2
      R=SQRT(X2+Y2)
      IF(R.LE.RCORE) THEN
         V(I,J)=V(I,J)-WVSQ*CORE2
      ELSE IF((R.GT.RCORE).AND.(R.LE.RCLAD)) THEN
         V(I,J)=V(I,J)-WVSQ*CLAD2
      ELSE
         V(I,J)=V(I,J)-WVSQ*AIR*AIR
      END IF
   60 CONTINUE
   80 CONTINUE
      V(I,J)=V(I,J)/FN2
  100 CONTINUE
  200 CONTINUE NTOTAL=NTOTX*NTOTY
      DO 400 I=1,NTOTAL
      DO 300 J=1,NTOTAL
      IF(I.EQ.J) THEN
         II=AINT(REAL(MATRIX(I)))
         JJ=AINT(AIMAG(MATRIX(I)))
         H(I,J)=V(II,JJ)
      ELSE
         H(I,J)=0.
      END IF
  300 CONTINUE
  400 CONTINUE

ELOW=-CORE2*WVSQ
      EHIGH=-CLAD2*WVSQ

RETURN
      END
```

APPENDIX B

```
      PROGRAM EVEC

C     M. MUNOWITZ
C     AMOCO TECHNOLOGY COMPANY
C     FIRST WRITTEN: OCTOBER, 1989

C     SIMPLE UTILITY PROGRAM TO CONVERT OUTPUT OF PROGRAM "FIBER2"
C     TO FILE SUITABLE FOR MATLAB GRAPHICS PACKAGE.

C     OUTPUT FILE IS "TEMP.M"

PARAMETER(NXMAX=65,NYMAX=65)
      REAL X(NXMAX),Y(NYMAX),FIELD(NXMAX,NYMAX)
      CHARACTER*80 TEXT
      CHARACTER*10 INFILE
      WRITE(*,*) 'INFILE: '
      READ(*,4000) INFILE
 4000 FORMAT(A10)
      OPEN(1,FILE=INFILE)
      READ(1,4010) TEXT
 4010 FORMAT(A80)
      READ(1,*) NTOTAL,NTOTX,NTOTY
      DO 100 I=1,NTOTAL
      READ(1,*) IX,JY,X(IX),Y(JY),FIELD(IX,JY)
  100 CONTINUE
      CLOSE(1)

OPEN(2,FILE='temp.m')
      DO 896 IY=1,NTOTY
      WRITE(2,*) 'field=['
      DO 891 IX=1,NTOTX
      WRITE(2,*) FIELD(IX,IY)
  891 CONTINUE
      WRITE(2,*) '];'
      IF(IY.LT.10) THEN
        WRITE(2,4020) IY
 4020   FORMAT('z(:,',I1,')=field;')
      ELSE
        WRITE(2,4030) IY
 4030   FORMAT('z(:,',I2,')=field;')
      END IF
      WRITE(2,*) 'clear field'
  896 CONTINUE WRITE(2,*) 'x=['
      DO 898 I=1,NTOTX
      WRITE(2,*) X(I)
  898 CONTINUE
      WRITE(2,*) '];'

WRITE(2,*) 'y=['
      DO 899 I=1,NTOTY
      WRITE(2,*) Y(I)
  899 CONTINUE
      WRITE(2,*) '];'
      CLOSE(2)

STOP
      END
```

APPENDIX C

```
c     First version, August, 1989
c     D.J.Vezzetti
c
c     Determines propagation constants and discrete mode profiles for
c     2 dimensional rib type waveguide.  Similar programs for buried
c     channel, conventional rib, conventional strip-loaded and other
c     guides made of rectangular sections.
c
c  Lx _____
c     !                                                            !
c     !           air (region 7)                                   !
c     !                                                            !
c     !.....................  _____  ......................... !
c     !                      !/////////!                           !
c     ! <--air (region 4) --> ! region 5 ! <--air (region 6)-->    !
c     !                      !/////////!                           !
c     !_____!/////////!_____!
c     !///////////////////////////////////////////////////////////!
c  x  ! ////////<-----upper clad ----(region 3)--------->//////////!
c     !_____!
c     !\\\\\\\\\\\\\\\\\\\\\\\\\\\\\\\\\\\\\\\\\\\\\\\\\\\\\\\\\\\!
c  !  !\\\\\\\\\\<-------guiding film (region 2) ------>\\\\\\\\\\\!
c  !  !\\\\\\\\\\\\\\\\\\\\\\\\\\\\\\\\\\\\\\\\\\\\\\\\\\\\\\\\\\\!
c  !  !_____!
c  !  !                                                            !
c  !  !          <---------lower clad (region 1)----------->       !
c  !  !                                                            !
c  0  !_____!
c     0                       y    ---------->                   Ly c     In the expansion method there are nnx sine terms in x
c                                       nny sine terms in y
c                                       ntot=nnx*nny total terms
c
c     x is the vertical direction
c     y is the lateral direction
c
c     The matrix whose eigenvalues are sought is d(ntot,ntot)
c
c     Uses method of Henry and verBeek c     Parameter values to be changed according to desired accuracy
c         and lateral extent of modes parameter (nnx=49,nny=49,ntot=nnx*nny,nreg=7,mxeval=80)
      real index(nreg)
      real xl(nreg),xr(nreg),yl(nreg),yr(nreg)
      real x(nreg,nnx,nnx),y(nreg,nny,nny)
      real b(nnx,nny,nnx,nny),d(ntot,ntot)
      real eval(mxeval),evec(ntot,mxeval)
      real rwksp(6000000)
      integer r
      character*8 outa,outb,outc,outd,oute,outf,outg
      character*8 outh,outi,outj
      common /worksp/ rwksp call iwkin(6000000)

c     Input from screen or from file write(*,*) ' enter job no. >> '
      read(*,*) id
```

```
      write(*,*) 'enter length in y (lateral) direction >> '
      read(*,*)  ylen
      write(*,*) 'enter width of rib      >> '
      read(*,*)  wrib
      write(*,*) 'enter thickness of lower clad  >> '
      read(*,*)  hlow
      write(*,*) 'enter thickness of film        >> '
      read(*,*)  hfilm
      write(*,*) 'enter height of rib above cladding  )>> '
      read(*,*)  hrib
      write(*,*) 'enter thickness of upper clad (etched)>> '
      read(*,*)  hup
      write(*,*) 'enter thickness of air above         >> '
      read(*,*)  hair
      write(*,*) 'enter index of upper clad            >> '
      read(*,*)  index(5)
      write(*,*) 'enter index of guiding film          >> '
      read(*,*)  index(2)
      write(*,*) 'enter index of lower clad            >> '
      read(*,*)  index(1)
      write(*,*) 'enter vacuum wavelength              >> '
      read(*,*)  wave pi=4.0*atan(1.0)

c     Test input data:

c     ylen=40.0
c     wrib=5.0
c     hfilm=.390
c     hlow=2.0
c     hrib=0.60
c     hup=0.36
c     hair=1.00
c     index(3)=3.3486
c     index(2)=3.3992
c     index(1)=3.3486
c     wave=0.845 c     Total vertical height of device:

xlen=hlow+hfilm+hup+hrib+hair c     Additional indices of rectangular regions:

index(5)=index(3)
      index(4)=1.0
      index(6)=1.0
      index(7)=1.0 c     Boundaries of rectangles:

yl(1)=0.0
      yl(2)=0.0
      yl(3)=0.0
      yl(4)=0.0
      yl(5)=(ylen-wrib)/2.0
      yl(6)=(ylen+wrib)/2.0
      yl(7)=0.0 yr(1)=ylen
      yr(2)=ylen
      yr(3)=ylen
      yr(4)=yl(5)
      yr(5)=yl(6)
```

```
      yr(6)=ylen
      yr(7)=ylen xl(1)=0.0
      xl(2)=hlow
      xl(3)=xl(2)+hfilm
      xl(4)=xl(3)+hup
      xl(5)=xl(4)
      xl(6)=xl(4)
      xl(7)=xl(4)+hrib
      xr(1)=xl(2)
      xr(2)=xl(3)
      xr(3)=xl(4)
      xr(4)=xl(7)
      xr(5)=xr(4)
      xr(6)=xr(4)
      xr(7)=xlen c     Method requires integration over each rectangle.  Full description
c        in notes (D.J.Vezzetti)
c     Integrals can be evaluated analytically.  Each splits into a product
c        of an 'x term' and a 'y term' c     Evaluation of off-diagonal x terms:

do 100 r=1,nreg
        do 95 n1=1,nnx-1
          fn1=float(n1)
          p1=fn1*pi/xlen
          do 90 n2=n1+1,nnx
            fn2=float(n2)
            p2=fn2*pi/xlen
            t1l=p1*xl(r)
            t1r=p1*xr(r)
            t2l=p2*xl(r)
            t2r=p2*xr(r)
            term1=cos(t1l)*sin(t2l)-cos(t1r)*sin(t2r)
            term2=sin(t1r)*cos(t2r)-sin(t1l)*cos(t2l)
            x(r,n1,n2)=2.0*(fn1*term1+fn2*term2)/(pi*(fn1**2-fn2**2))
 90       continue
 95     continue
100   continue c     Remainder of off-diagonal x terms by symmetry:

do 103 r=1,nreg
        do 102 n1=1,nnx-1
          do 101 n2=n1+1,nnx
            x(r,n2,n1)=x(r,n1,n2)
101       continue
102     continue
103   continue c     Diagonal x terms:

do 110 r=1,nreg
        term1=(xr(r)-xl(r))/xlen
        do 105 n1=1,nnx
          fn1=float(n1)
          t1l=2.0*fn1*pi*xl(r)/xlen
          t1r=2.0*fn1*pi*xr(r)/xlen
          term2=(sin(t1r)-sin(t1l))/(2.0*fn1*pi)
          x(r,n1,n1)=term1-term2
105     continue
```

```
      110 continue c     Off-diagonal y terms:

do 130 r=1,nreg
        do 125 n1=1,nny-1
          fn1=float(n1)
          p1=fn1*pi/ylen
          do 120 n2=n1+1,nny
            fn2=float(n2)
            p2=fn2*pi/ylen
            t1l=p1*yl(r)
            t1r=p1*yr(r)
            t2l=p2*yl(r)
            t2r=p2*yr(r)
            term1=cos(t1l)*sin(t2l)-cos(t1r)*sin(t2r)
            term2=sin(t1r)*cos(t2r)-sin(t1l)*cos(t2l)
            y(r,n1,n2)=2.0*(fn1*term1+fn2*term2)/(pi*(fn1**2-fn2**2))
  120     continue
  125   continue
  130 continue c     Remainder of off-diagonal y terms by symmetry:

do 133 r=1,nreg
        do 132 n1=1,nny-1
          do 131 n2=n1+1,nny
            y(r,n2,n1)=y(r,n1,n2)
  131     continue
  132   continue
  133 continue c     Diagonal y terms:

do 140 r=1,nreg
        term1=(yr(r)-yl(r))/ylen
        do 135 n1=1,nny
          fn1=float(n1)
          t1l=2.0*fn1*pi*yl(r)/ylen
          t1r=2.0*fn1*pi*yr(r)/ylen
          term2=(sin(t1r)-sin(t1l))/(2.0*fn1*pi)
          y(r,n1,n1)=term1-term2
  135   continue
  140 continue c     Construct four dimensional array b (see notes)
c        (first disregarding additional diagonal contribution):

do 170 n1=1,nnx
        do 165 n2=1,nnx
          do 160 m1=1,nny
            do 155 m2=1,nny
              bb=0.0
              do 150 r=1,nreg
                bb=bb+x(r,n1,n2)*y(r,m1,m2)*(index(r)**2)
  150         continue
              b(n1,m1,n2,m2)=bb
  155       continue
  160     continue
  165   continue
  170 continue c     Now include diagonal contribution:
```

```
      do 190 n1=1,nnx
        t1=(float(n1)*wave/(2.0*xlen))**2
        do 185 m1=1,nny
          t2=(float(m1)*wave/(2.0*ylen))**2
          b(n1,m1,n1,m1)=b(n1,m1,n1,m1)-t1-t2
185     continue
190   continue
``` c     Now convert b into a conventional square matrix 'd' by
c     numbering elements going down column 1, then column 2, etc.

```
      do 220 n1=1,nnx
        do 215 m1=1,nny
          k1=n1+(m1-1)*nnx
          do 210 n2=1,nnx
            do 205 m2=1,nny
              k2=n2+(m2-1)*nnx
              d(k1,k2)=b(n1,m1,n2,m2)
205         continue
210       continue
215     continue
220   continue
``` c     Diagonalization routine uses standard IMSL subroutine
c     Range of eigenvalues sought between elow and ehigh
c        (these will change according to the structure)

```
      c=amax1(index(1),index(3))
      elow=c*c
      ehigh=index(2)*index(2)

call evfsf(ntot,mxeval,d,ntot,elow,ehigh,neval,eval,evec,ntot)
``` c     Optional write to screen of eigenvalues and effective mode indices:

c     write(*,*) ' # eigenvalues in range = ',neval
c     write(*,*) '                         '
c     write(*,*) ' eigenvalue    effective index' c     do 275 j=1,neval
c 275 write(*,*) eval(j),sqrt(eval(j))
c     Create output files 'djvxxx.a', 'djvxxx.b', ...
c         where xxx = the id mumber from first input
c
c     File 'djvxxx.a' contains the various device dimensions and
c         parameters as well as the square roots of the eigenvalues
c         which are the effective mode indices.
c     File 'djvxxx.b' contains the first 5 modes in a form to be
c         deciphered by program called 'pat55.for'
c     File 'djvxxx.c' contains the next 5 modes (if they exist)
c     If more than 10 modes are wanted, the section of code around line
c         310 can be repeated with obvious changes.

```
      outa='djv    .a'
      outb='djv    .b'
      outc='djv    .c' write(outa(4:6),6298) id
      write(outb(4:6),6298) id
      write(outc(4:6),6298) id 6298  format(i3.3)
```

```fortran
      open(8,file=outa)
          write(8,*) ' rib width = ',wrib
          write(8,*) ' length in y (lateral) direction = ', ylen
          write(8,*) ' thickness of lower clad = ',hlow
          write(8,*) ' thickness of film = ',hfilm
          write(8,*) ' height of rib = ',hrib
          write(8,*) ' thickness of upper clad  = ',hup
          write(8,*) ' thickness of air above = ',hair
          write(8,*) ' index of upper clad = ',index(3)
          write(8,*) ' index of guiding film = ',index(2)
          write(8,*) ' index of lower clad = ',index(1)
          write(8,*) ' vacuum wavelength = ',wave
      do 278 j=1,neval
            k=neval+1-j
 278  write(8,2473) sqrt(eval(k))
2473  format(f6.4)
      close(8)

open(8,file=outb)
            k1=neval
            k2=neval-1
            k3=neval-2
            k4=neval-3
            k5=neval-4
      do 300 j=1,ntot
 300      write(8,111) evec(j,k1),evec(j,k2),evec(j,k3),
     &    evec(j,k4),evec(j,k5)
      close(8)

if(neval.gt.5) then
         open(8,file=outc)
            k1=neval-5
            k2=neval-6
            k3=neval-7
            k4=neval-8
            k5=neval-9
         do 310 j=1,ntot
 310     write(8,111) evec(j,k1),evec(j,k2),evec(j,k3),
     &   evec(j,k4),evec(j,k5)
         close(8)
      endif stop
      end
```

APPENDIX D

```
c     Original version, August, 1989
c     D.J.Vezzetti
c
c     This program uses as input the files 'djvxxx.b' or 'djvxxx.c'
c     which were generated by program 'rib2dim'.  The eigenvectors
c     in those files are the coefficients of certain sine and cosine
c     terms in the series expansions of the modes of the waveguide.
c     This program converts those coefieients into a function of
c     x and y (the mode) and evaluates each mode on a 55 by 55
c     grid of points.  The values at these points are then written
c     to files as follows: 5 modes from 'djvxxx.b' are written to
c     5 files 'djvxxx_1.mb',...,'djvxxx_5.mb'; the five modes from
c     'djvxxx.c' are written to 5 files 'djvxxx_1.mc',...,'djvxxx_5.mc'
c
c     These last files are in a form suitable for graphic presentation
c     using the software package "PC-MATLAB".
c
c
c     neig=# of eigenvalues on the data file
c     ntot=nnx*nny=dimension of eigenvectors(must agree with nnx and nny
c          as used in 'rib2dim.for'
c
      parameter(nnx=49,nny=49,ntot=nnx*nny,neig=80)
      real pat(ntot,5),fig(55,55,5)
      character*4 str1,str2
      character*11 out9,out10,out11,out12,out13
      character*8 infile
      character*1 app str1='z(:,'
      str2=')=y;' write(*,*) 'enter file no.'
      read(*,*) id write(*,*) 'enter letter extension of input file : b, c, etc. >>'
      read(*,*) app infile='djv    . ' out9='djv    _1.m '
      out10='djv    _2.m '
      out11='djv    _3.m '
      out12='djv    _4.m '
      out13='djv    _5.m '
      write(infile(4:6),2345) id
      write(infile(8:8),2346) app
      write(out9(4:6),2345) id
      write(out10(4:6),2345) id
      write(out11(4:6),2345) id
      write(out12(4:6),2345) id
      write(out13(4:6),2345) id
      write(out9(11:11),2346) app
      write(out10(11:11),2346) app
      write(out11(11:11),2346) app
      write(out12(11:11),2346) app
      write(out13(11:11),2346) app
 2345 format(i3.3)
 2346 format(a1)

pi=4.0*atan(1.0)
      piby54=pi/54.0
```

```fortran
c      Read in data from 'djvxxx.b', etc open(8,file=infile)

111    format(5(e12.8,2x))
       do 200 j=1,ntot
200        read(8,111) pat(j,1),pat(j,2),pat(j,3),pat(j,4),pat(j,5)
       close(8)

c      Convert eigenvector of coefficients into values of mode on the
c         55 by 55 grid:

do 310 nn=1,5
       do 300 i=1,55
             fi=float(i-1)
       do 295 j=1,55
             fj=float(j-1)
         u=0.0
         do 280 ii=1,nnx
            w=sin(float(ii)*fi*piby54)
            do 260 jj=1,nny
               v=sin(float(jj)*fj*piby54)
               k=ii+(jj-1)*nnx
               u=u+w*v*pat(k,nn)
260    continue
280    continue
       fig(i,j,nn)=u
295    continue
300    continue
310    continue c      Write each mode to a file suitable for MATLAB software:

open(9,file=out9)
       write(9,*)
       do 500 j=1,55
         write(9,*) ' y=['
         do 490 i=1,55
            write(9,*) fig(i,j,1)
490      continue
         write(9,*) ' ] ; '
         write(9,77) str1,j,str2
500    continue
       close(9)

open(10,file=out10)
       write(10,*)
       do 510 j=1,55
         write(10,*) ' y=[ '
         do 505 i=1,55
            write(10,*) fig(i,j,2)
505      continue
         write(10,*) ' ] ; '
         write(10,77) str1,j,str2
510    continue
       close(10)

open(11,file=out11)
       write(11,*)
       do 520 j=1,55
         write(11,*) ' y=[ '
         do 515 i=1,55
            write(11,*) fig(i,j,3)
```

```
515     continue
        write(11,*) ' ] ; '
        write(11,77) str1,j,str2
520     continue
        close(11)

open(12,file=out12)
        write(12,*)
        do 530 j=1,55
          write(12,*) ' y=[ '
          do 525 i=1,55
            write(12,*) fig(i,j,4)
525       continue
          write(12,*) ' ] ; '
          write(12,77) str1,j,str2
530     continue
        close(12)

open(13,file=out13)
        write(13,*)
        do 540 j=1,55
          write(13,*) ' y=[ '
          do 535 i=1,55
            write(13,*) fig(i,j,5)
535       continue
          write(13,*) ' ] ; '
          write(13,77) str1,j,str2
540     continue
        close(13)

77      format(a4,i2,a4)

stop
        end
```

40

We claim:

1. A raised-rib waveguide for providing a low-loss coupling to a conventional single-mode optical fiber propagating light of a wavelength ($\lambda$), said waveguide having the following structural and compositional parameters:

upper and lower claddings of heights ($h_{uc}$) and ($h_{lc}$), respectively, and refractive indices ($n_{uc}$) and ($n_{lc}$), respectively;

a film interposed between the upper and lower claddings of a height ($h_f$) and refractive index ($n_f$);

a rib formed in the upper cladding having a width (w) and a height ($h_r$); and values assigned to each of the structural and compositional parameters ($h_f$), ($h_{uc}$), ($h_{lc}$), ($h_r$), ($n_f$), ($n_{uc}$) and ($n_{lc}$) such that a shape of a mode formed by the light propagating through the waveguide approximates a circular shape of a fundamental mode of the light propagated by the optical fiber, thereby providing a coupling whose power loss is less than 10 percent.

2. The raised-rib waveguide of claim 1 wherein the values of the structural and compositional parameters are such that the waveguide supports only one TE mode.

3. A raised-rib waveguide as set forth in claim 1 wherein the wavelength ($\lambda$) of the propagating light is approximately 0.8–0.9 microns, the refractive indices of the upper and lower claddings are equal, $n_{uc}=n_{lc}$, and the difference between the refractive indices ($n_f$)−($n_{uc}$) is in the range of 0.01–0.02.

4. A raised-rib waveguide as set forth in claim 1 wherein the wavelength ($\lambda$) of the propagating light is approximately 0.8–0.9 microns, the difference between refractive indices ($n_f$)−($n_{uc}$) is in the range of 0.01–0.02, and the refractive index of the lower cladding not being equal to that of the upper cladding but of such a value as to permit the light to propagate in a guided mode.

5. A raised-rib waveguide as set forth in claim 1 wherein the value of the height ($h_f$) of the film is in the range of 0.3–0.5 microns.

6. A raised-rib waveguide as set forth in claim 2 wherein the value of the height ($h_f$) of the film is in the range of 0.3–0.5 microns.

7. A raised-rib waveguide as set forth in claim 3 wherein the value of the height ($h_f$) of the film is in the range of 0.3–0.5 microns.

8. A raised-rib waveguide as set forth in claim 4 wherein the value of the height ($h_f$) of the film is in the range of 0.3–0.5 microns.

9. For a raised-rib waveguide having a core of a height ($h_f$) and a refractive index ($n_f$), upper and lower claddings of a height ($h_{uc}$) and ($h_{lc}$) and refractive indices ($n_{uc}$) and ($n_{lc}$), respectively, and a rib of a width (w) and height ($h_r$), a method of selecting values for ($h_f$), ($n_f$), ($h_{uc}$), ($h_{lc}$), ($n_{uc}$), ($n_{lc}$), (w) and ($h_r$) such that the waveguide is configured to optimize coupling between it and a conventional single-mode optical fiber, said method comprising the steps of:

assigning predetermined values to ($h_f$), ($n_f$), ($h_{uc}$), ($h_{lc}$), ($n_{uc}$), ($n_{lc}$), (w) and ($h_r$) that provide for the propagation of light at a selected wavelength ($\lambda$) in the core of the waveguide;

varying the value of each of ($h_f$), ($n_f$), ($h_{uc}$), ($h_{lc}$), ($n_{uc}$), ($n_{lc}$), (w) and ($h_r$) over a range of values while holding the others constant;

determining the effect on the shape of a modal structure of the propagating light caused by varying each of ($h_f$), ($n_f$), ($h_{uc}$), ($h_{lc}$), ($n_{uc}$), ($n_{lc}$), (w) and ($h_r$) over the range of values and creating a database of the effects; and selecting a set of values for ($h_f$), ($n_f$), ($h_{uc}$), ($h_{lc}$), ($n_{uc}$), ($n_{lc}$), (w) and ($h_r$) from the ranges of values that approximates an optimum low-loss coupling to the conventional single mode optical fiber while maintaining the waveguide's ability to propagate light at the selected wavelength ($\lambda$).

10. A raised-rib waveguide for propagating light at a wavelength of approximately 0.8–0.9 microns coupled to the waveguide by a conventional optical fiber such that losses at a coupling interface are substantially minimized and range around −0.3 to −1.0 dB, the waveguide comprising:

a lower cladding having a height ($h_{lc}$) and a refractive index ($n_{lc}$);

an upper cladding having a height ($h_{uc}$) and a refractive index ($n_{uc}$);

a film interposed between the upper and lower claddings having a height ($h_f$) and a refractive index ($n_f$), where the difference between the refractive indices ($n_f$)−($n_{uc}$) is in the range of 0.01–0.02 and the value of the height ($h_f$) of the film is in the range of 0.3–0.5 microns; and a rib formed from the upper cladding having a height ($h_r$) and a width (w).

11. The raised-rib waveguide of claim 10 wherein the refractive indices ($n_{lc}$) and ($n_{uc}$) of the lower and upper claddings, respectively, are equal.

12. The raised-rib waveguides of claim 10 wherein the refractive indices ($n_{lc}$) and ($n_{uc}$) of the lower and upper claddings, respectively, are not equal but are chosen to permit the light to propagate in a guided mode.

13. The waveguide of claim 11 wherein the core and upper and lower claddings are fabricated from $Al_xGa_{l-x}As$ and $Al_yGa_{l-y}As$, respectively, where $0.02 \leq (y-x) \leq 0.035$.

14. The waveguide of claim 12 wherein the core and upper cladding are fabricated from $Al_xGa_{l-x}As$ and $Al_yGa_{l-y}As$, respectively, where $0.02 \leq (y-x) \leq 0.035$.

15. The waveguide of claim 11 wherein the core layer is fabricated from layered or quantum well material in such a manner as to preserve the difference of refractive indices ($n_f$)−($n_{uc}$) in the range 0.01–0.02.

16. The waveguide of claim 12 wherein the core layer is fabricated from layered or quantum well material in such a manner as to preserve the difference of refractive indices ($n_f$)−($n_{uc}$) in the range 0.01–0.02.

17. The waveguide of claim 10 wherein the structural and compositional parameters are such that the waveguide supports only one TE mode.

* * * * *